United States Patent [19]
Oshita

[11] Patent Number: 5,796,530
[45] Date of Patent: Aug. 18, 1998

[54] LENS SYSTEM WITH SWITCHABLE SOFT FOCUS

[75] Inventor: Koichi Oshita, Tokyo, Japan

[73] Assignee: Nikon Corporation, Tokyo, Japan

[21] Appl. No.: 694,403

[22] Filed: Aug. 12, 1996

[30] Foreign Application Priority Data

Aug. 17, 1995 [JP] Japan ................. 7-231948

[51] Int. Cl.$^6$ ................. G02B 9/18
[52] U.S. Cl. ............ 359/795; 359/694; 359/683; 359/692
[58] Field of Search .............. 359/707, 716, 359/717, 733, 735, 736, 740, 739, 738, 748, 793, 795, 645, 646, 661, 691, 692

[56] References Cited

U.S. PATENT DOCUMENTS

| | | | |
|---|---|---|---|
| 4,273,424 | 6/1981 | Nanjoh | 359/707 |
| 4,310,221 | 1/1982 | Momiyama et al. | 359/707 |
| 4,825,235 | 4/1989 | Wakabayashi et al. | 354/195.12 |
| 4,826,301 | 5/1989 | Ikemori | 359/707 |
| 4,948,236 | 8/1990 | Hirano | 359/707 |

*Primary Examiner*—Frank G. Font
*Assistant Examiner*—Michael P. Stafira
*Attorney, Agent, or Firm*—Klarquist Sparkman Campbell Leigh & Whinston, LLP

[57] ABSTRACT

A lens system is disclosed that can be used in either a normal sharp-focus configuration or in any of several soft-focus configurations for obtaining, for example, sharply focused or soft-focus photographic images of an object. The lens system has simple construction and axially comprises, in the normal sharp-focus configuration and from the object side, a first lens group having positive refractive power, an aperture stop, and a rear lens group having negative refractive power. To obtain a sharp-focus image, light passes through both lens groups and the aperture stop. For obtaining a soft-focus image, the second lens group is retracted (i.e., displaced from the optical axis such that light from the object does not pass through the second lens group), and light passes only through the first lens group and the aperture stop.

24 Claims, 21 Drawing Sheets

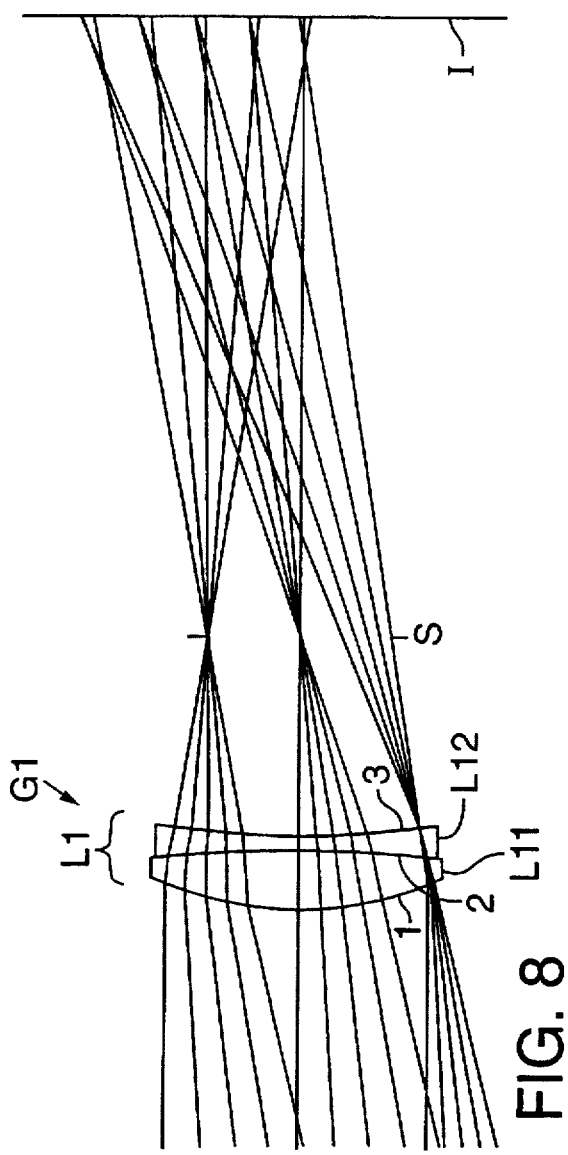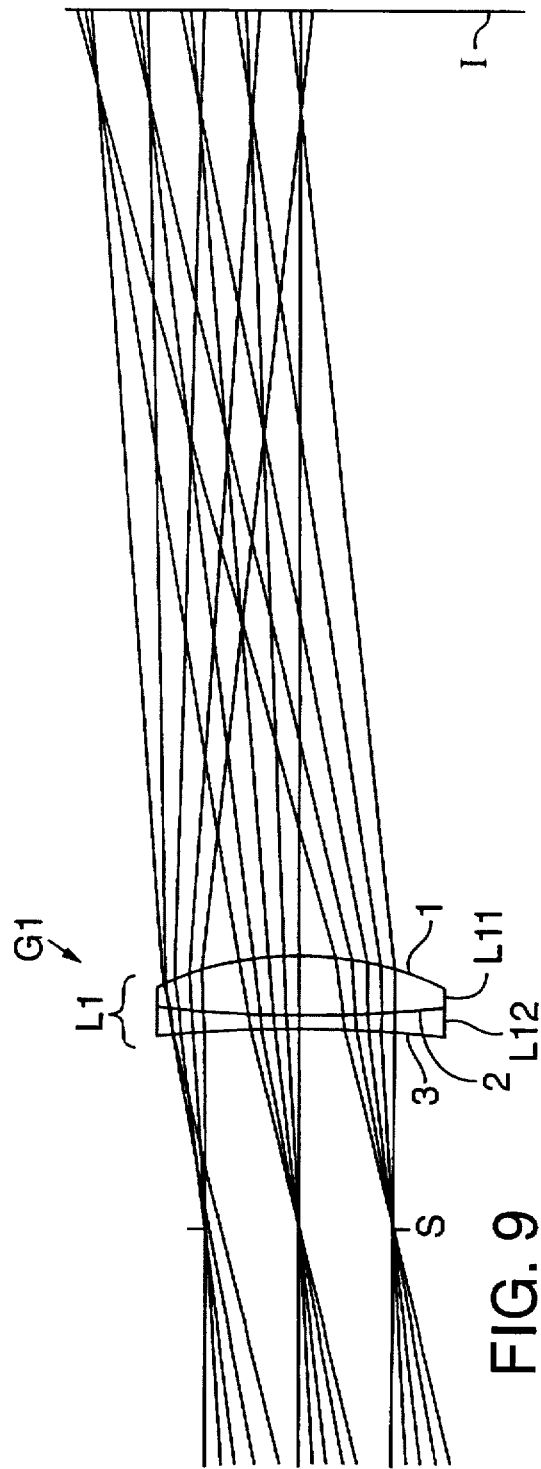

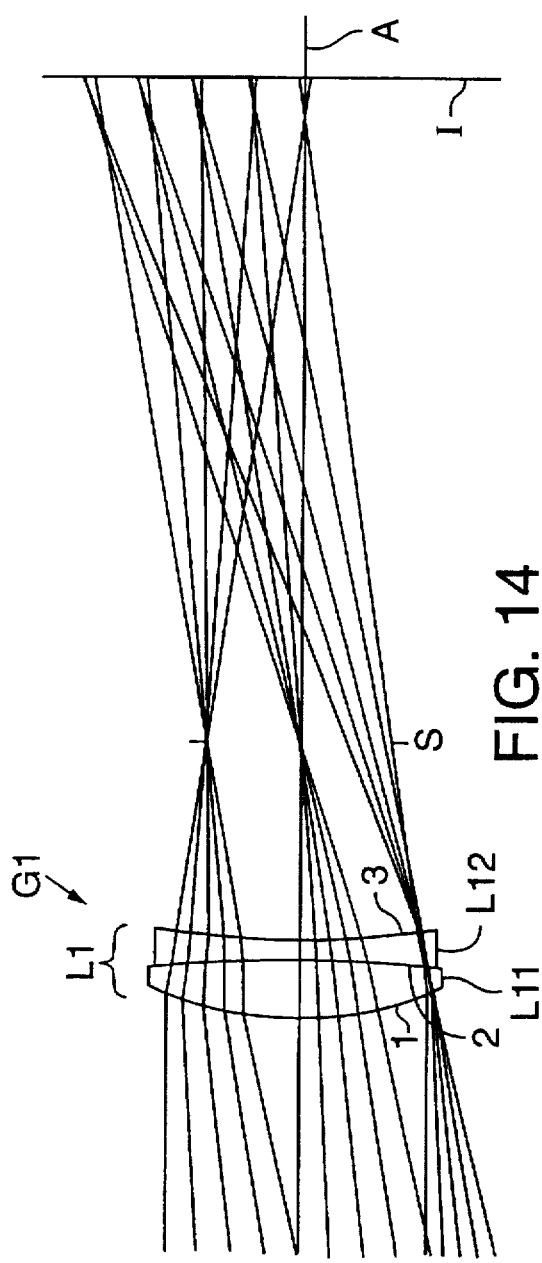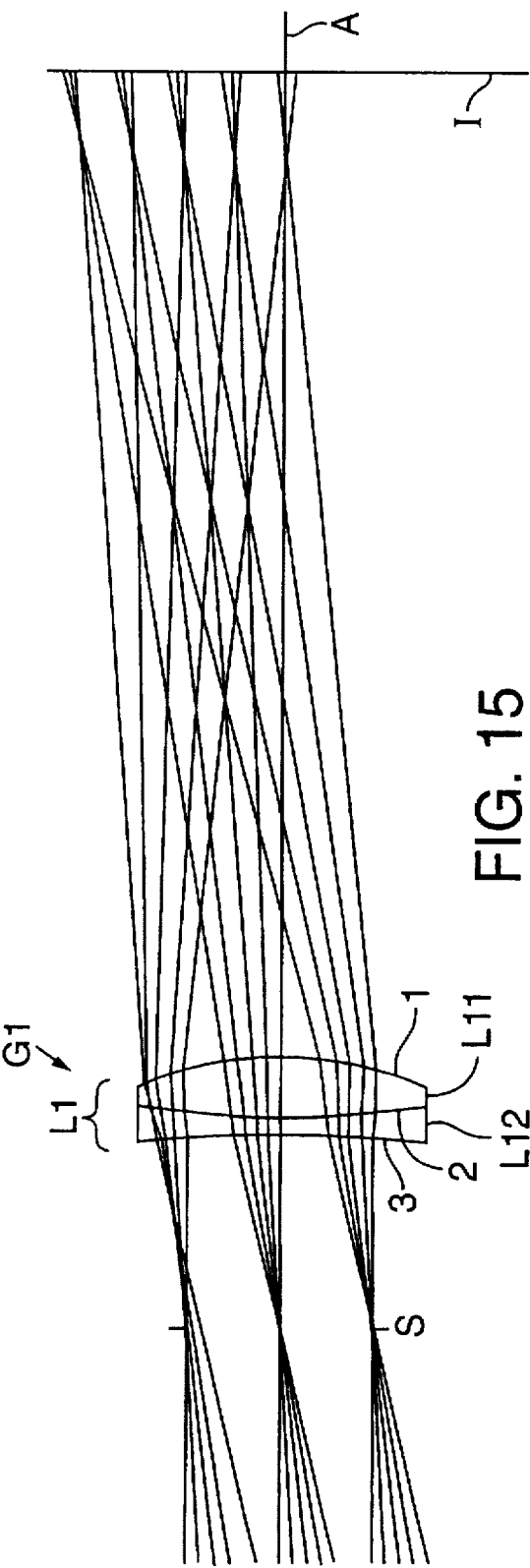

LENS SYSTEM WITH SWITCHABLE SOFT FOCUS

FIELD OF THE INVENTION

The present invention pertains to lens systems usable generally for photography. More specifically, it pertains to mid-range telephoto lenses usable with still cameras and the like for selectably performing normal sharp-focus photography and soft-focus photography.

BACKGROUND OF THE INVENTION

Conventional telephoto lenses for photographic use that have a mid-range focal length generally possess an appropriate field angle and provide a "natural" distance perspective in the photograph. Such lenses can also be used satisfactorily for close-up photography while maintaining a convenient separation of the photographic subject from the lens. Consequently, midrange telephoto lenses are widely used for obtaining portraits of people and for obtaining close-up photographs of small objects such as flowers.

When using a mid-range telephoto lens for photographing subjects such as people and flowers, it is sometimes desirable to employ a "soft focus" in order to favorably express the delicacy and softness of the subject. In many instances, a soft focus is achieved by attaching an extraneous "soft-focus" filter, diffusion disc, or the like to a photographic lens.

Alternatively, soft focus can be achieved by using a "soft-focus" lens that is designed to retain some degree (sometimes a variable degree) of spherical aberration. The spherical aberration causes every point on the photographic film to be surrounded with a diffuse halo. Unfortunately, conventional photographic lenses intended for soft-focus use are not satisfactory for use in conditions requiring sharp focus of a subject. Thus, there is a need for a photographic lens capable of being selectably used for soft-focus or sharp-focus photography, particularly such a lens that can be conveniently "switched" from one to the other mode of operation.

One type of mid-range telephoto lens having a switchable soft-focus capability is disclosed in Japan Kokai Patent document No. SHO 52-76921. The lens has five lens elements divided into two lens groups. The degree of spherical aberration is changed, while maintaining a substantially constant back focus, by moving each of the two lens groups in a non-linear fashion. Unfortunately, the mechanism for achieving such movement of lens groups is undesirably complex. If the back focus were allowed to vary while changing the degree of soft focus, the amount of spherical aberration imparted by the lens could be changed simply by changing the axial distance between the two lens groups. However, this requires that eccentricity tolerances for both lens groups be extremely small, and requires high-precision fabrication in order to achieve the desired optical performance. This inevitably results in high cost.

SUMMARY OF THE INVENTION

The shortcomings of the prior art as summarized above are cured by the present invention which provides lens systems having simple construction that can be easily switched from a "soft-focus" mode to a normal "sharp-focus" mode.

According to general aspects of a preferred embodiment of the invention, a lens system is provided that comprises a first lens group having positive refractive power, an aperture stop, and a second lens group having negative refractive power.

The lens system is operable in a first configuration with sufficient aberration correction to form a normal "sharp-focus" image, on an image plane of the lens system, of an object, such as for photographic purposes. In the first configuration, the first lens group is situated axially objectwise, the second lens group is situated axially imagewise, and the aperture stop is axially situated between the first and second lens groups.

The lens system is also operable in a second configuration that exhibits sufficient spherical aberration to form a soft-focus image on the image plane of the object. In the second configuration, the second lens group is axially retracted, thereby leaving the first lens group and the aperture stop axially situated to form the image. Axial retraction of the second lens group typically means detaching the second lens group from the first lens group and aperture stop, although other means for retraction are also comprehended for moving the second lens group away from the optical axis such that image-forming light passes through the first lens group and the aperture stop but not through the second lens group for making the soft-focus image.

According to a preferred embodiment, the second configuration comprises either or both of a first soft-focus configuration in which the first lens group is axially situated objectwise of the aperture stop, and a second soft-focus configuration in which the aperture stop is axially situated objectwise of the first lens group. Further preferably, when the lens system is converted from the first soft-focus configuration to the second soft-focus configuration, or vice versa, the axial spacing between the aperture stop and the first lens group is unchanged.

Further according to a preferred embodiment, the first lens group comprises a cemented positive meniscus lens having a convex surface oriented objectwise (i.e., toward the object side) in the first configuration. The cemented lens preferably includes, from the object side, a biconvex lens element cemented to a negative (preferably biconcave) lens element. The second lens group preferably consists of either a single negative meniscus lens element or a cemented negative meniscus lens. In either event, the second lens group preferably has, in the first configuration, a convex surface oriented imagewise (i.e., toward the image side).

Further according to a preferred embodiment, a lens system preferably satisfies one or more of the following conditions:

$$0.7 < f1/f < 0.85$$

$$-0.15 < r4/f < -0.09$$

$$0 \leq \{(n2-n1)\}^{1/2}/r5 < 0.55$$

$$0.05 < (n2-n1)$$

$$0.85 < \{n1-(0.4 \cdot n2)-(40/v1)+(23/v2)\} < 0.95$$

wherein, when the lens system is in the first configuration, f is the focal length of the lens system, f1 is the focal length of the first lens group; r5 is the curvature radius of the convex surface of the second lens group, r4 is the curvature radius of the objectwise surface of the second lens group; n1 and v1 are the refractive index (d-line) and the Abbe number, respectively, of the biconvex lens element in the first lens group; and n2 and v2 are the refractive index (d-line) and the Abbe number, respectively, of the negative lens element in the first lens group.

Other features and advantages of lens systems according to the present invention are readily ascertainable by reference to the following detailed description and drawings.

BRIEF DESCRIPTION OF THE DRAWINGS

FIG. 8 is an optical diagram showing specific aspects of Example Embodiment 2 in a first soft-focus photography configuration.

FIG. 9 is an optical diagram showing specific aspects of Example Embodiment 2 in a second soft-focus photography configuration.

FIG. 14 is an optical diagram showing specific aspects of Example Embodiment 3 in a first soft-focus photography configuration.

FIG. 15 is an optical diagram showing specific aspects of Example Embodiment 3 in a second soft-focus photography configuration.

DETAILED DESCRIPTION

Figure 1:
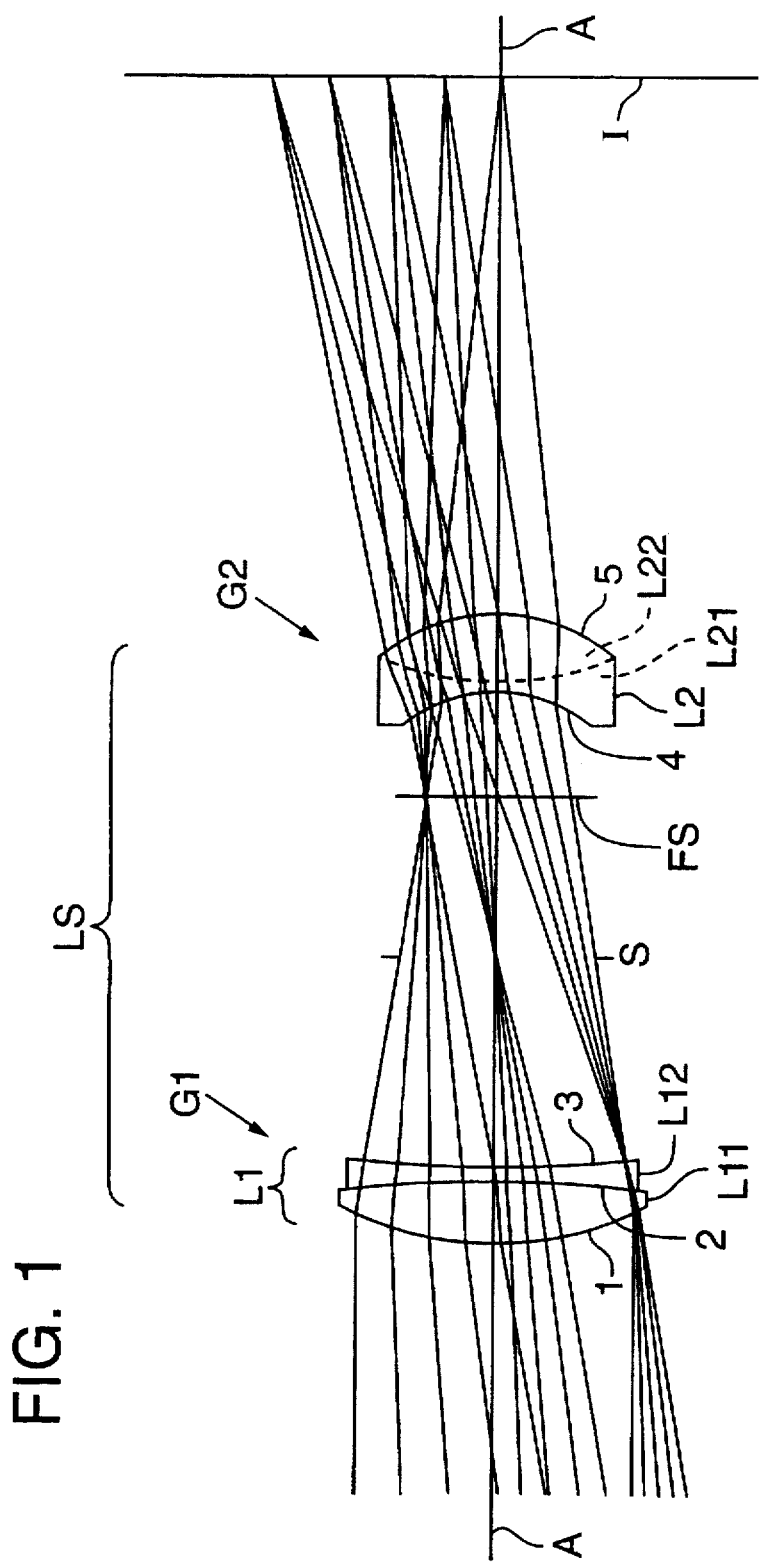
FIG. 1 is an optical diagram showing general aspects of a lens system according to the present invention as well as specific aspects of Example Embodiment 1 as used for normal sharp-focus photography.

As shown generally in FIG. 1, a lens system LS according to the present invention, as used for normal sharp-focus photography, comprises (in order from the object side) a first lens group G1 having a positive refractive power, an aperture stop S, and a second lens group G2 having a negative refractive power. During use of the lens system LS for normal "sharp-focus" photography, the lens groups G1, G2 and aperture stop S are all situated on an optical axis A for producing a sharp image at an image plane I. The lens system preferably has a "2-group×3-element" configuration, by which is meant that the lens system has only two lens groups and a total of only three lens elements. Preferably, as shown in FIG. 1, the first lens group G1 comprises a cemented positive meniscus lens L1 having a convex surface oriented toward the object side and including a biconvex lens element L11 and a biconcave lens element L12; and the second lens group G2 comprises a negative meniscus lens L2 having a convex surface oriented toward the image side. The lens L2 can be simple or compound (e.g., a cemented doublet).

As is customary with a mid-range telephoto lens, the first lens group G1 has a convergent action. The biconvex-biconcave lens element construction of the lens L1 of this group renders the group effective in correcting spherical aberration during normal sharp-focus use and for correcting chromatic aberration and coma. The cemented lens L1 can form an image at the image plane I of a photographic subject disposed objectwise of the lens system LS.

With respect to the second lens group, the negative meniscus lens L2 has a divergent action that functions as a field flattener serving to correct any image-surface distortion imparted by the first lens group G1. It is noted that even better correction of aberrations can be obtained if the negative meniscus lens L2 is actually a cemented lens including a negative lens element L21 and a positive lens element L22 (shown by dashed lines in FIG. 1).

Figure 2:
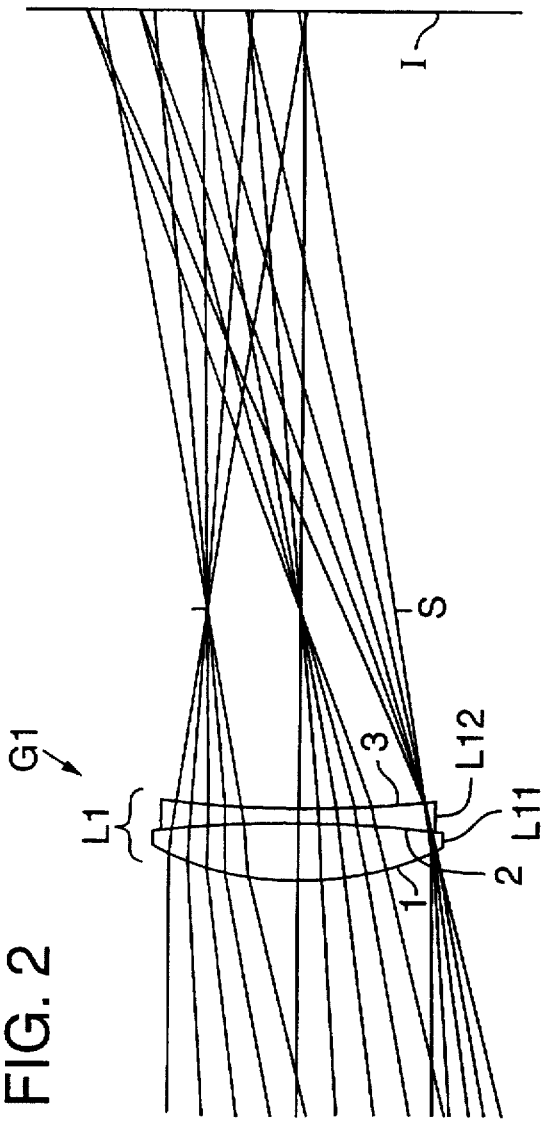
FIG. 2 is an optical diagram showing general aspects of a lens system according to the present invention as well as specific aspects of Example Embodiment 1 in a first soft-focus photography configuration.

FIG. 2 shows general aspects of one possible configuration in which the lens system of FIG. 1 can be used for soft-focus photography. As seen in FIG. 2, the second lens group G2 has been retracted; i.e., removed from the optical axis A such that light from the subject passes only through the first lens group G1 and the aperture stop S. In addition, the first lens group G1 and the aperture stop S have been moved together imagewise to form the image at the same image plane I as in normal sharp-focus photography.

Figure 3:
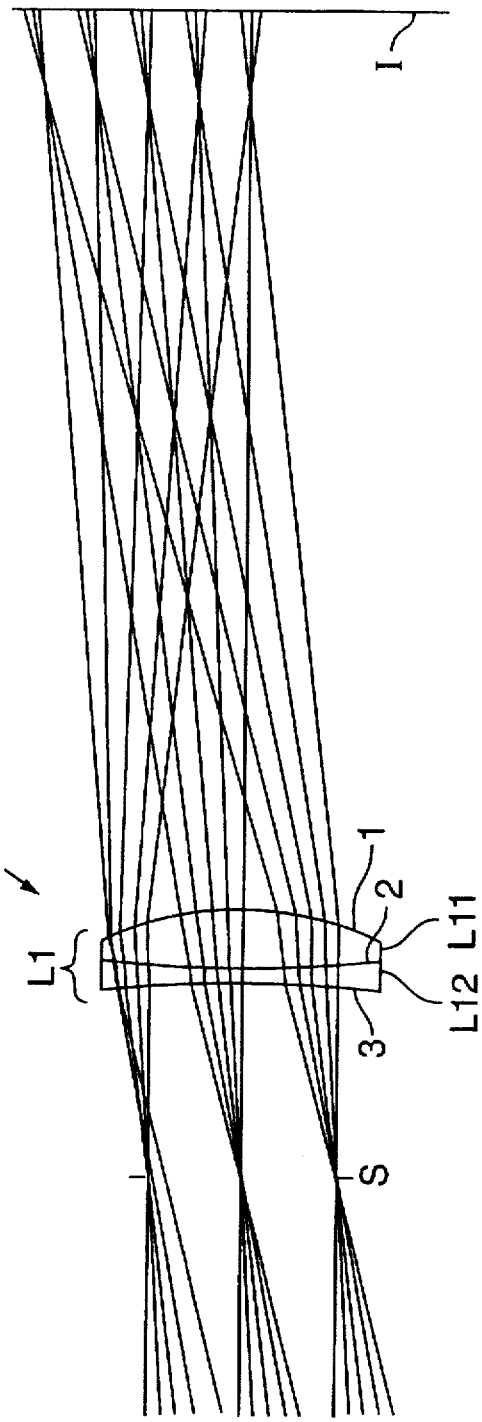
FIG. 3 is an optical diagram showing general aspects of a lens system according to the present invention as well as specific aspects of Example Embodiment 1 in a second soft-focus photography configuration.

An alternative configuration of the lens system of FIG. 1 for performing soft-focus photography is shown in FIG. 3 wherein, as in FIG. 2, the second lens group G2 is retracted. Also, while maintaining the same spacing between the first lens group G1 and the aperture stop S as used in normal sharp-focus photography, the order of the first lens group G1 and the aperture stop S on the axis A is reversed from that used in normal sharp-focus photography. That is, as shown in FIG. 3, light from the photographic subject passes first through the aperture stop S and then through the first lens group G1. In other words, the lens system in FIG. 3 is inverted compared to FIG. 2.

The second lens group G2 functions inter alia, as a field flattener during normal sharp-focus photography. The second lens group G2 also functions to correct negative spherical aberrations imparted by the first lens group G1. Each of the first and second lens groups independently functions to correct astigmatism.

Thus, a lens system according to the present invention can be used, with both the first and second lens groups, for normal sharp-focus photography. For soft-focus photography, the spherical aberration of the lens system is intentionally changed by retracting the second lens group from the optical axis, i.e., from the light path from the photographic subject to the image plane.

The second lens group can be configured either as a negative meniscus lens (simple or compound) having a convex surface oriented toward the object side, or a negative meniscus lens (simple or compound) having a convex surface oriented toward the image side. Whenever the convex surface is oriented toward the object side, spherical aberration is independently corrected by both the first lens group G1 and the second lens group G2. Also, any negative astigmatism left by the first lens group G1 is corrected by the second lens group G2. However, we have found that, whenever the convex surface is oriented toward the image side, astigmatism tends to be independently corrected, at least to some extent, by both the first lens group G1 and the second lens group G2, and any negative spherical aberration uncorrected by the first lens group G1 is corrected by the second lens group G2.

In view of the foregoing, it is preferable that the second lens group G2 comprise a negative meniscus lens (simple or compound) L2 having a convex surface oriented toward the image side. It is also preferable that the first lens group G1 comprise, in order from the object side, a cemented positive meniscus lens L1, in which a biconvex lens element L11 is cemented to a biconcave lens element L12 having a convex surface oriented toward the object side, wherein the lens system satisfies the following Conditional Expressions (1) through (5):

$$0.7 < f1/f < 0.85 \qquad (1)$$

$$-0.15 < r4/f < -0.09 \qquad (2)$$

$$0 \leq [f(n2-n1)^{1/2}]/r5 < 0.55 \qquad (3)$$

$$0.05 < (n2-n1) \qquad (4)$$

$$0.85 < [n1-(0.4 \cdot n2)-(40/v1)+(23/v2)] < 0.95 \qquad (5)$$

wherein:

f is the overall focal length of the lens system as used for normal sharp-focus photography;

f1 is the focal length of the first lens group G1;

r5 is the curvature radius of the image-side surface of the lens element L12;

r4 is the curvature radius of the object-side surface of the negative meniscus lens L2;

n1 is the refractive index (d-line) of the lens element L11 in the first lens group;

n2 is the refractive index (d-line) of the lens element L12 in the first lens group;

v1 is the Abbe number of the lens element L11; and v2 is the Abbe number of the lens element L12.

Conditional Expression (1) imposes limits on the image-plane distortion exhibited by the subject lens system during use for normal sharp-focus photography and to the change in focal length of the lens system when switching from normal sharp-focus photography to soft-focus photography. Exceeding the upper limit of Conditional Expression (1) causes the distortion contribution of the second lens group to be too small, which renders the lens system susceptible to negative image-plane distortion during use for normal sharp-focus photography. Falling below the lower limit of Conditional Expression (1) renders the lens system susceptible to positive image-plane distortion during normal sharp-focus photography, which causes an excessive (and inconvenient) change of lens-system focal length during a change from normal sharp-focus photography to soft-focus photography.

Conditional Expression (2) imposes limits on the amount of change in spherical aberration exhibited by the lens system when the second lens group is present on the optical axis (i.e., the lens system is used for normal sharp-focus photography) compared to when the second lens group is retracted from the optical axis (i.e., the lens system is used for soft-focus photography). Exceeding the upper limit of Conditional Expression (2) excessively increases the spherical aberration exhibited by the lens system during use for soft-focus photography, which undesirably leaves an excessive amount of asymmetric inward coma in the lens system during use for soft-focus photography and thus diminishes imaging performance of the lens system. Falling below the lower limit of Conditional Expression (2) excessively reduces the spherical aberration exhibited by the lens system during use for soft-focus photography, especially whenever the lens system is not inverted, thereby producing an insufficient soft-focus effect at the center of the image produced by the lens system.

Conditional Expression (3) pertains to astigmatism correction. Exceeding the upper limit of Conditional Expression (3) causes the lens system to exhibit an undesirable distortion of the meridional image plane in the positive direction during use for both normal sharp-focus photography and soft-focus photography; this effect is especially marked during use of the lens system for soft-focus photography with the lens system inverted. Falling below the lower limit of Conditional Expression (3) undesirably distorts the meridional image plane in the negative direction during use of the lens system for both normal sharp-focus photography and soft-focus photography; this effect is especially marked during use of the lens for normal sharp-focus photography.

Conditional Expression (4) provides a practical range for the difference between the refractive index of the lens element L12 and the refractive index of the lens element L11 as a prerequisite for fulfilling Conditional Expression (3). In order for the lens system to effectively correct spherical aberration during use for normal sharp-focus photography, the refractive index n2 must be greater than the refractive index n1. This is because the curvature radius of the object-side surface of the lens element L12 can be made large to the extent that the difference between the refractive indices of lens elements L11 and L12 is great; this, in turn, is beneficial for correcting aberrations. In other words, falling below the lower limit of Conditional Expression (4) makes it impossible to effectively correct spherical aberration in the lens system during use for normal sharp-focus photography.

Conditional Expression (5) pertains to providing an effective correction of coma in the lens system as used for normal sharp-focus photography. The simplest construction of a lens system according to the present invention is a 2-group×3-element configuration in which the first lens group G1 is a positive-negative cemented lens and the second lens group G2 is a single negative meniscus lens. With such a configuration, there is less freedom for correcting aberrations compared to more complex configurations, such as a 3-group×3-element triplet configuration. Thus, it is important to optimally select the lens elements of the lens system to ensure adequate correction of aberrations such as coma and transverse chromatic aberration. Falling below the lower limit of Conditional Expression (5) is undesirable because inward coma and transverse chromatic aberration marked are too marked under such conditions. Exceeding the upper limit of Conditional Expression (5) is undesirable because outward coma and positive transverse chromatic aberration are excessive under such conditions.

Figure 25:
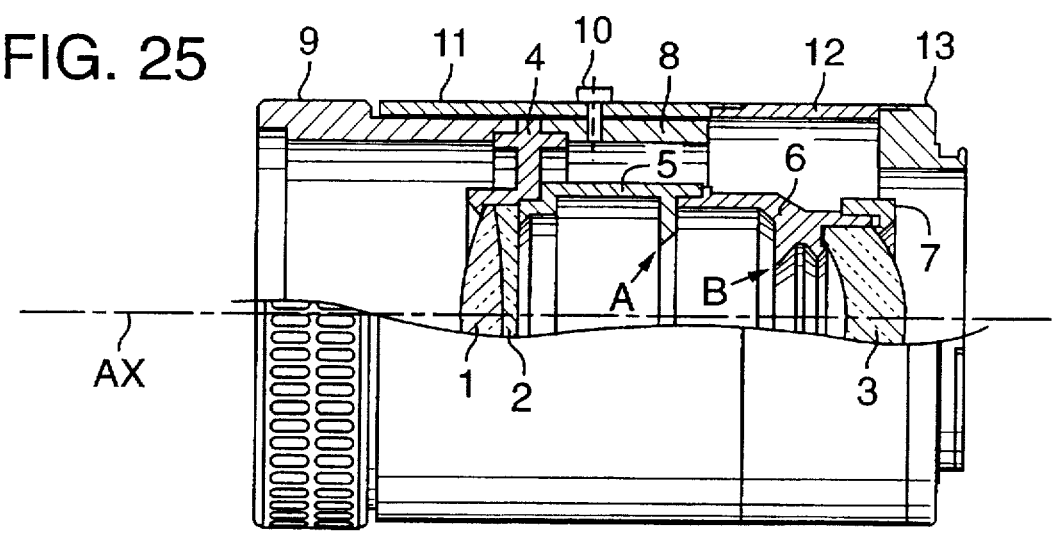
FIG. 25 is a partially cut-away depiction of a preferred lens-barrel embodiment for a lens system according to the present invention configured for normal sharp-focus photography.

FIG. 25 shows a preferred embodiment of a lens barrel for a lens system according to the present invention configure for normal sharp-focus photography. As used herein, the "lens barrel" is the assemblage of mechanical components serving as a housing for the lens system and mountings for the constituent optical components; the lens barrel includes, for example, threaded cylindrical members and the like that are used for focusing and for holding lens elements appropriately for use. The FIG. 25 lens barrel configuration is advantageous because it readily permits the lens system to be used both for normal sharp-focus photography and for soft-focus photography; for soft-focus use, the lens system can be either inverted or non-inverted on the optical axis. However, other suitable lens barrel embodiments are also useful even if any of such embodiments do not readily permit the lens system to be used, during soft-focus photography, in both an inverted or non-inverted manner. I.e., it is satisfactory if the lens system can be used for soft-focus photography in either the inverted or non-inverted configuration. This allows the lens barrel construction to be simplified.

The lens system shown in FIG. 25 comprises the first lens group consisting of a positive doublet in which a biconvex lens element 1 is cemented to a biconcave lens element 2. The second lens group consists of a negative meniscus lens element 3. The first and second lens groups are mounted in lens chambers 4 and 6, respectively. The first lens group is secured in the first lens chamber 4 by a retainer ring 5. The second lens group is secured by a retainer ring 7. The second lens chamber 6 is fastened to the retainer ring 5 by threads, bayonet, or other suitable means allowing the second lens chamber 6 to be readily attached to and detached from the retainer ring 5 by the user. The assembled first lens chamber 4, retainer ring 5, second lens chamber 6, and retainer ring 7 provide an appropriate spacing between the first and second lens groups for normal sharp-focus photography.

The lens barrel of FIG. 25 also comprises a first outer tube 11, a second outer tube 12, and a camera mount 13 that collectively comprise an "outer portion" of the lens barrel. The first outer tube 11, second outer tube 12, and camera mount 3 are fastened to each other using threads or other suitable means allowing disassembly by the user.

The lens barrel of FIG. 25 also comprises a focusing ring 9 and a cam tube 8 that collectively comprise an "inner portion" of the lens barrel. The focusing ring 9 and cam tube 8 are fastened to the first lens chamber 4 by threads or the like allowing disassembly. A cam pin 10 extending through the first outer tube 11 and into a groove in the cam tube 8 allows the inner portion of the lens barrel to move back and forth along the optical axis AX in response to axial rotation of the focusing ring 9 by the user.

The FIG. 25 embodiment also includes a protrusion A on the retainer ring 5 that defines an aperture stop of the lens system (e.g., aperture stop S in FIG. 1), and a protrusion B on the second lens chamber 6 that defines a fixed stop (e.g., fixed stop FS in FIG. 1).

Figure 26:
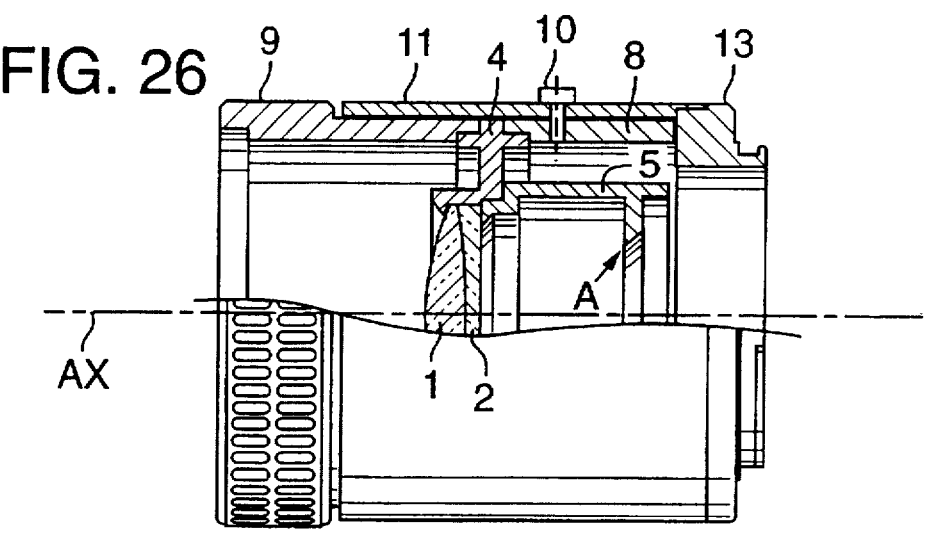
FIG. 26 is a partially cut-away depiction of the FIG. 25 lens barrel embodiment in a first configuration for performing soft-focus photography.
Figure 27:
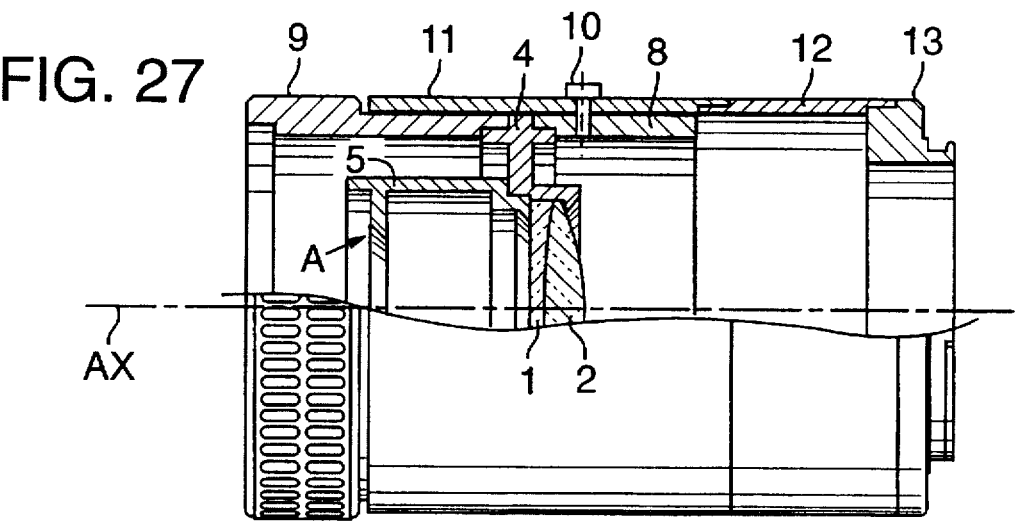
FIG. 27 is a partially cut-away depiction of the FIG. 25 lens barrel embodiment in a second configuration for performing soft-focus photography.

FIG. 26 depicts the lens barrel of FIG. 25 in a "first soft-focus photography configuration," by which is meant a soft-focus photography configuration in which the lens system is not inverted on the optical axis. FIG. 27, in contrast, depicts the lens barrel of FIG. 25 in a "second soft-focus photography configuration," by which is meant a soft-focus photography configuration in which the lens system is inverted on the optical axis. In both soft-focus photography configurations, the second lens group is detached from the lens system.

Specifically, in FIG. 26, the second lens chamber 6 has been detached from the retainer ring 5. This removal of the second lens chamber 6 effectively removes the lens element 3 (i.e., the second lens group) and the protrusion B (i.e., the fixed stop FS) from the lens system.

The image plane of the FIG. 26 configuration is preferably at the same location on the optical axis as the image plane in the normal sharp-focus configuration (FIG. 25). This is achieved, as shown in FIG. 26, by removing the second outer tube 12 and connecting the mount 13 directly to the first outer tube 11. I.e., the length of the second outer tube 12 is specified to provide the lens system, whenever the lens system is used for normal sharp-focus photography, with an overall length (the axial distance from the lens surface closest to the object side to the image plane,) that is equal to the overall length of the lens system in the first soft-focus photography configuration.

To place the lens system in the second soft-focus photography configuration (FIG. 27) the second lens chamber 6 is removed from the retainer ring 5. Also, the focusing ring 9 is temporarily removed to allow inversion of the first lens chamber 4 on the optical axis AX compared to the normal sharp-focus photography configuration. The focusing ring 9 is then re-attached.

When inverting the first lens chamber 4 as shown in FIG. 27, it is important that the lens system achieve the desired back focus. In the embodiment shown in FIGS. 25–27, the focusing ring 9 and the cam tube 8 are appropriately dimensioned, relative to the first lens chamber 4, to achieve this objective.

It is also possible to construct the lens barrel such that the cam tube 8 and focusing ring 9 are directly linked to each other and the focusing ring 9 is internally linked to the first lens chamber 4. Such a configuration can improve the operability of switching from normal sharp-focus photography to soft-focus photography because the retainer ring 5, second lens chamber 6, and retainer ring 7 are simultaneously removed together with the first lens chamber 4 whenever the focusing ring 9 is removed.

EXAMPLE EMBODIMENTS

The lens system of each of the following example embodiments can be used for both normal sharp-focus photography and for soft-focus photography. For normal sharp-focus photography, each lens system comprises, in axial order from the object side, a first lens group G1 having a positive refractive power, an aperture stop S, and a second lens group G2 having a negative refractive power. Each lens system can also be used in a first soft-focus photography configuration and in a second soft-focus photography configuration. In the first soft-focus photography configuration, the second lens group G2 is retracted from the optical axis and the soft-focus image is formed by means, in order from the object side, of the first lens group G1 and the aperture stop S. In the second soft-focus photography configuration, the second lens group G2 is retracted from the optical axis and the order of the first lens group G1 and the aperture stop S on the optical axis is reversed (i.e., the first lens group G1 and aperture stop S are inverted as a unit on the optical axis). Thus, in the second soft-focus photography configuration, the image is formed by means, in order from the object side, of the aperture stop S and the first lens group G1.

Example Embodiment 1

FIG. 1 shows specific aspects of Example Embodiment 1 as configured for normal sharp-focus photography. The FIG. 1 embodiment comprises, as the first lens group, a cemented positive lens L1 including a biconvex lens L11 and a biconcave lens L12. The FIG. 1 embodiment also comprises an aperture stop S, a fixed stop FS, and (as the second lens group) a negative meniscus lens element L2 having a convex surface oriented toward the image side.

Since harmful flare from the center field angle to the perimeter field angle is blocked by the fixed stop FS, this embodiment exhibits improved perimeter image performance.

FIG. 2 depicts the embodiment of Example Embodiment 1 in a first soft-focus photography configuration. As can be seen, the fixed stop FS and the negative meniscus lens element L2 are retracted from the optical axis. Thus, a soft-focus image is formed at the image plane I by means, in order from the object side, of the cemented positive lens L1 and the aperture stop S.

FIG. 3 depicts the embodiment of Example Embodiment 1 in a second soft-focus photography configuration. As can be seen, the fixed stop FS and the negative meniscus lens element L2 are retracted from the optical axis, and the axial order from the object side of the cemented lens L1 and the aperture stop S has been inverted. Thus, a soft-focus image is formed at the image plane I by means, in order from the object side, of the aperture stop S and the cemented positive lens L1.

Numerical data for Example Embodiment 1 are listed in Table 1. In Table 1, f represents the overall focal length of the lens system, FN represents the F number, 2ω represents the field angle, Bf represents the back focus, and TL represents the telephoto ratio. The numbers in the left-most column of Table 1 represent lens surfaces. With respect to column headings, r is the curvature radius of each lens surface, d is the axial distance between the various lens surfaces, and n and ν are the refractive indices (d-line, λ=587.6 nm) and Abbe numbers of the corresponding lens elements.

TABLE 1

Normal Sharp-Focus Photography Configuration f = 100.000 mm
Bf = 42.266 mm
FN = 4.59
2ω = 20.2°
TL = 0.920

| Surface | r (mm) | d (mm) | n | ν |
|---|---|---|---|---|
| 1 | 27.0615 | 4.8412 | 1.62041 | 60.14 |
| 2 | −91.0731 | 1.1686 | 1.80384 | 33.89 |
| 3 | 99.1462 | 16.6938 | | |

TABLE 1-continued

| S | ∞ | 12.5204 | | |
|---|---|---|---|---|
| FS | ∞ | 8.5138 | | |
| 4 | −11.4847 | 6.0098 | 1.51680 | 64.10 |
| 5 | −14.9687 | 42.2663 | | |

First Soft-Focus Photography Configuration f = 73.486 mm
Bf = 67.451 mm
FN = 3.37
2ω = 26.9°

| Surface | r (mm) | d (mm) | n | ν |
|---|---|---|---|---|
| 1 | 27.0615 | 4.8412 | 1.62041 | 60.14 |
| 2 | −91.0731 | 1.1686 | 1.80384 | 33.89 |
| 3 | 99.1462 | 16.6938 | | |
| S | ∞ | 50.7569 | | |

Second Soft-Focus Photography Configuration f = 73.486 mm
Bf = 76.097 mm
FN = 4.78
2ω = 27.8°

| Surface | r (mm) | d (mm) | n | ν |
|---|---|---|---|---|
| S | ∞ | 16.6938 | | |
| 3 | −99.1462 | 1.1686 | 1.80384 | 33.89 |
| 2 | 91.0731 | 4.8412 | 1.62041 | 60.14 |
| 1 | −27.0615 | 76.0967 | | |

Values of Conditional Expressions (1) f1/f = 0.735
(2) r4/f = −0.115
(3) |f(n2 − n1)$^{1/2}$|/r5 = 0.432
(4) n2 − n1 = 0.183
(5) |n1 − (0.4 · n2) − (40/ν1) + (23/ν2)| = 0.912

Figure 4:
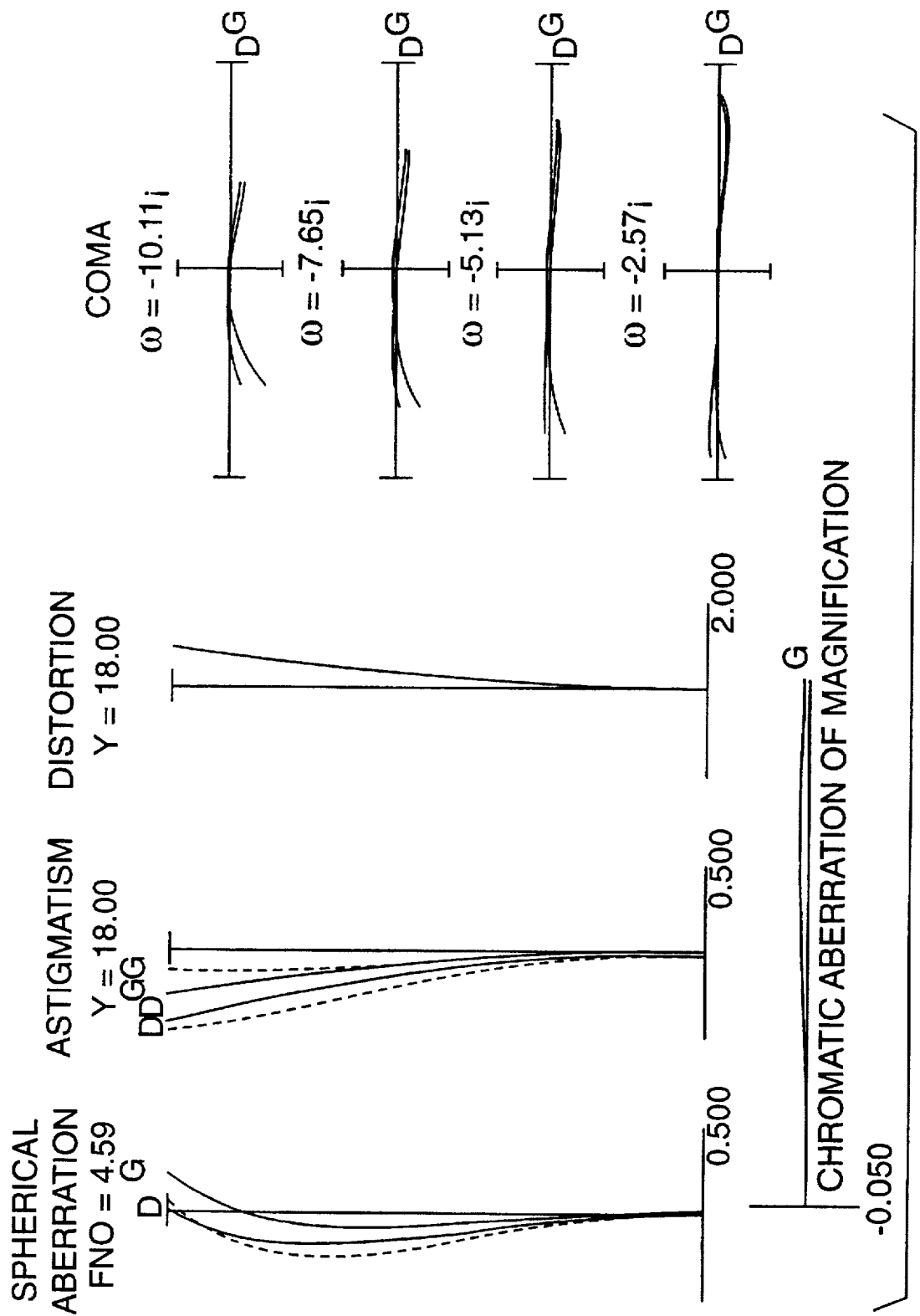
FIG. 4 is a set of aberration plots for Example Embodiment 1 as used for normal sharp-focus photography.
Figure 5:
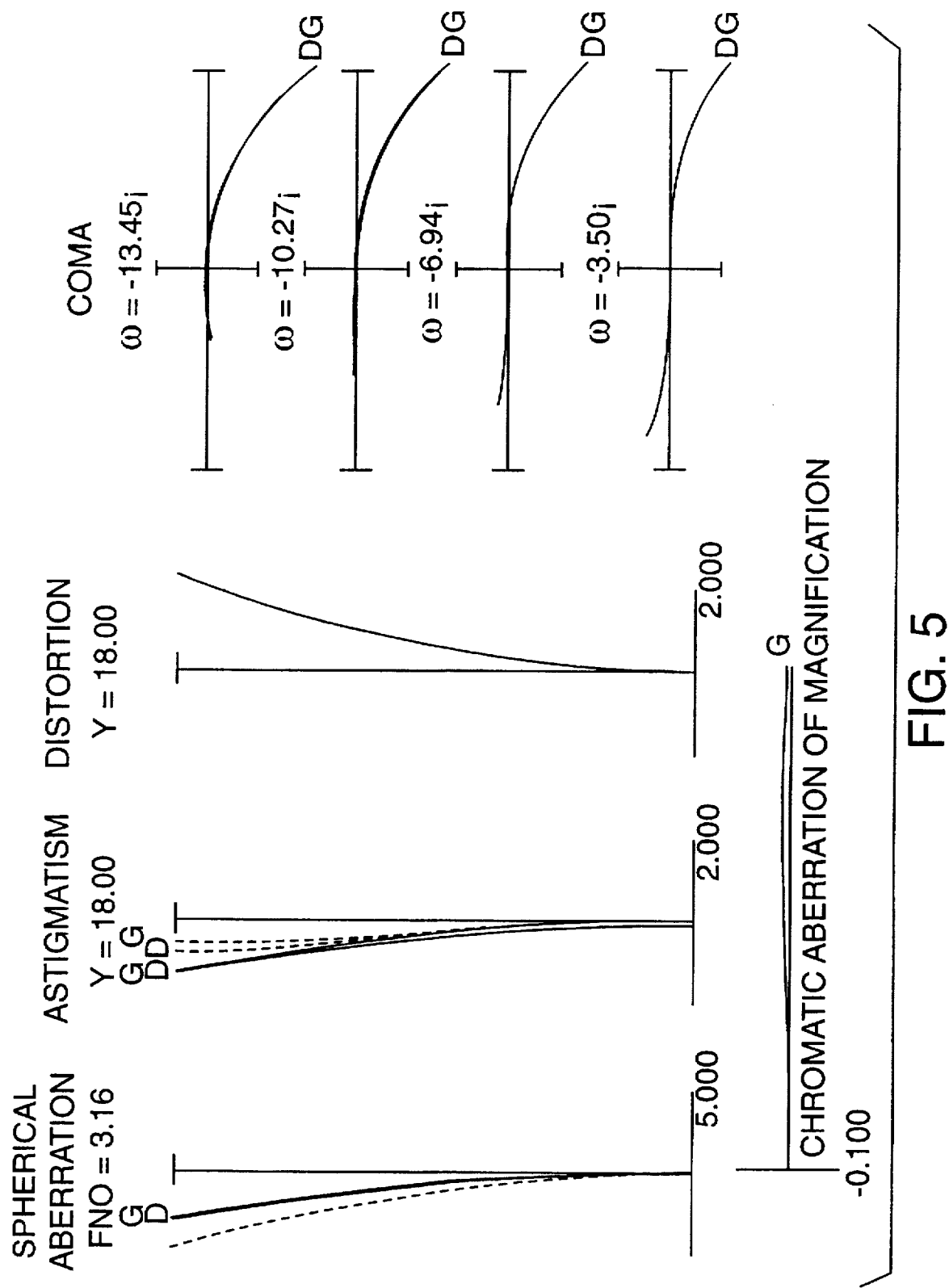
FIG. 5 is a set of aberration plots for Example Embodiment 1 in a first configuration for soft-focus photography.
Figure 6:
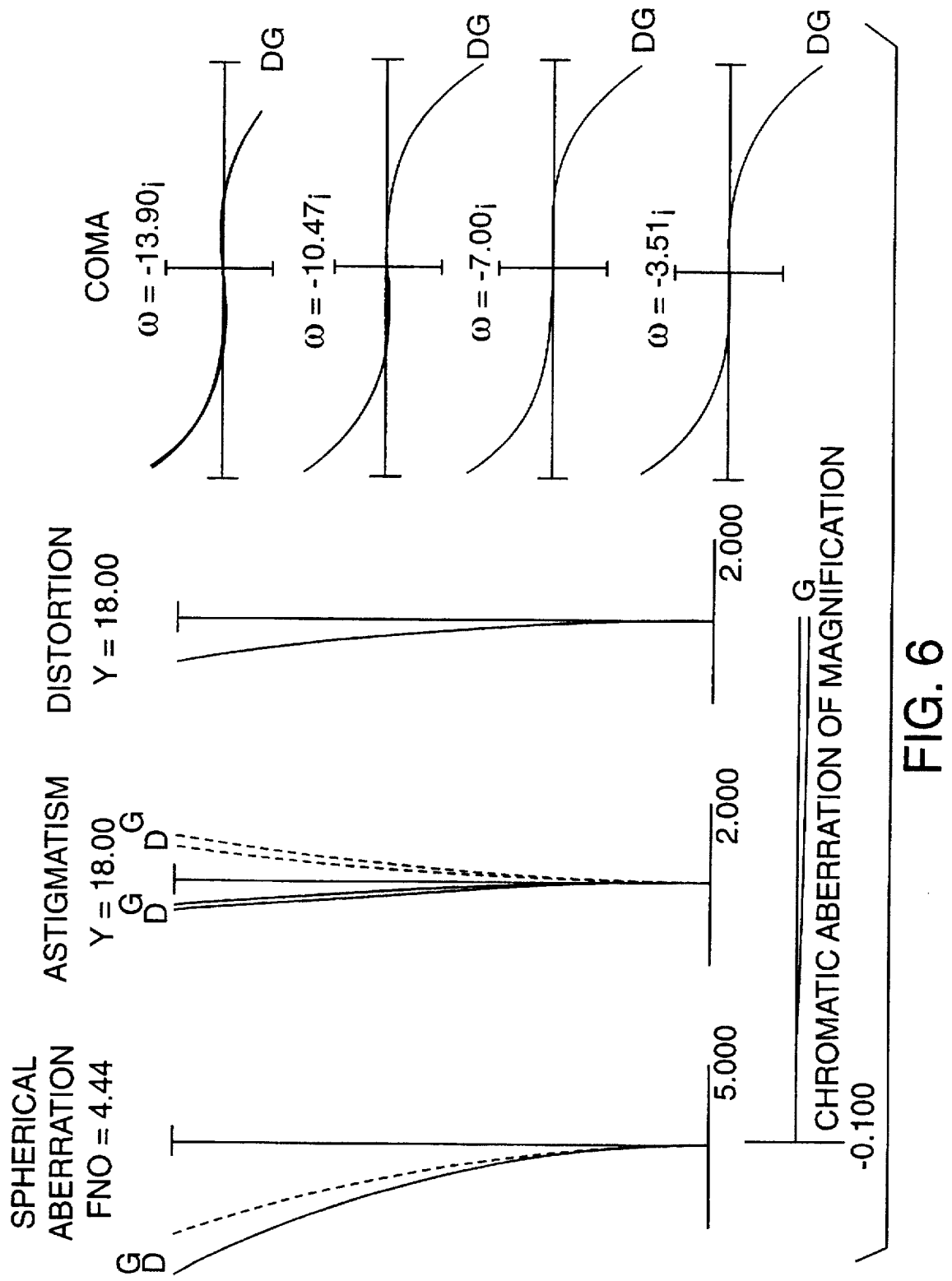
FIG. 6 is a set of aberration plots for Example Embodiment 1 in a second configuration for soft-focus photography.

FIGS. 4–6 are plots of various aberrations for the normal sharp-focus photography configuration, the first soft-focus photography configuration, and the second soft-focus photography configuration, respectively, for this Example Embodiment. In each figure, FNO denotes the F number, Y denotes the image height, ω denotes the half-field angle, D denotes d-line (λ=587.6 nm), and G denotes g-line (λ=435.8 nm). In each astigmatism plot, the solid line denotes the sagittal image plane and the dashed line denotes the meridional image plane. In the spherical aberration plots, the dashed line denotes the sine condition.

As is clear from FIGS. 4–6, the various aberrations are effectively corrected in the normal sharp-focus photography configuration, and excellent soft-focus images can be obtained in the first and second soft-focus photography configurations of this Example Embodiment.

Example Embodiment 2

Figure 7:
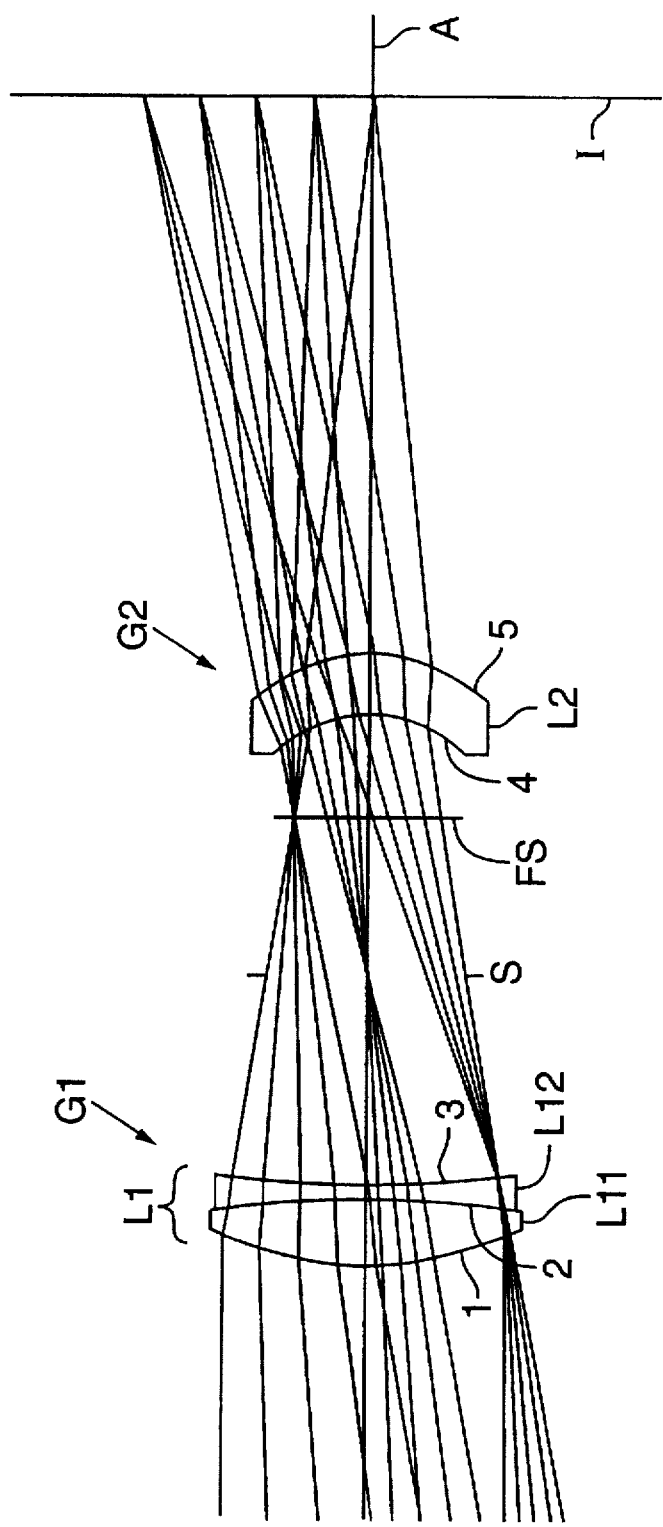
FIG. 7 is an optical diagram showing specific aspects of Example Embodiment 2 as used for normal sharp-focus photography.

FIG. 7 shows specific aspects of Example Embodiment 2 as configured for normal sharp-focus photography. The FIG. 7 embodiment comprises, as the first lens group, a cemented positive lens L1 including a biconvex lens L11 and a biconcave lens L12. The FIG. 7 embodiment also comprises an aperture stop S, a fixed stop FS, and (as the second lens group) a negative meniscus lens element L2 having a convex face oriented toward the image side.

Since harmful flare from the center field angle to the perimeter field angle is blocked by the fixed stop FS, this embodiment exhibits improved perimeter image performance.

FIG. 8 depicts the embodiment of Example Embodiment 2 in a first soft-focus photography configuration. As can be seen, the fixed stop FS and the negative meniscus lens element L2 are retracted from the optical axis. Thus, a soft-focus image is formed at the image plane I by means, in order from the object side, of the cemented positive lens L1 and the aperture stop S.

FIG. 9 depicts the embodiment of Example Embodiment 2 configured for the second soft-focus photography configuration. As can be seen, the fixed stop FS and the negative meniscus lens element L2 are retracted from the optical axis, and the axial order from the object side of the cemented lens L1 and the aperture stop S has been inverted. Thus, a soft-focus image is formed at the image plane I by means, in order from the object side, of the aperture stop S and the cemented positive lens L1.

Numerical data for Example Embodiment 2 are listed in Table 2. In Table 2, f represents the overall focal length of the lens system, FN represents the F number, 2ω represents the field angle, Bf represents the back focus, and TL represents the telephoto ratio. The numbers in the left-most column of Table 2 represent lens surfaces. With respect to column headings, r is the curvature radius of each lens surface, d is the axial distance between the various lens surfaces, and n and ν are the refractive indices (d-line, λ=587.6 nm) and Abbe numbers of the corresponding lens elements.

TABLE 2

Normal Sharp-Focus Photography Configuration f = 100.000 mm
Bf = 43.905 mm
FN = 4.60
2ω = 20.3°
TL = 0.924

| Surface | r (mm) | d (mm) | n | ν |
|---|---|---|---|---|
| 1 | 25.4784 | 5.1667 | 1.62280 | 57.03 |
| 2 | −84.2205 | 1.1667 | 1.80384 | 33.89 |
| 3 | 79.1257 | 16.6667 | | |
| S | ∞ | 12.5000 | | |
| FS | ∞ | 8.2500 | | |
| 4 | −9.7885 | 4.7500 | 1.51823 | 58.90 |
| 5 | −12.2447 | 43.9054 | | |

First Soft-Focus Photography Configuration f = 75.522 mm
Bf = 68.547 mm
FN = 3.47
2ω = 26.3°

| Surface | r (mm) | d (mm) | n | ν |
|---|---|---|---|---|
| 1 | 25.4784 | 5.1667 | 1.62280 | 57.03 |
| 2 | −84.2205 | 1.1667 | 1.80384 | 33.89 |
| 3 | 79.1257 | 16.6667 | | |
| S | ∞ | 51.8804 | | |

Second Soft-Focus Photography Configuration f = 75.522 mm
Bf = 78.981 mm
FN = 4.95
2ω = 27.0°

| Surface | r (mm) | d (mm) | n | ν |
|---|---|---|---|---|
| S | ∞ | 16.6667 | | |
| 3 | −79.1257 | 1.1667 | 1.80384 | 33.89 |
| 2 | 84.2205 | 5.1667 | 1.62280 | 57.03 |

TABLE 2-continued

| 1 | −25.4784 | 78.9809 | | |
|---|---|---|---|---|

Figure 10:
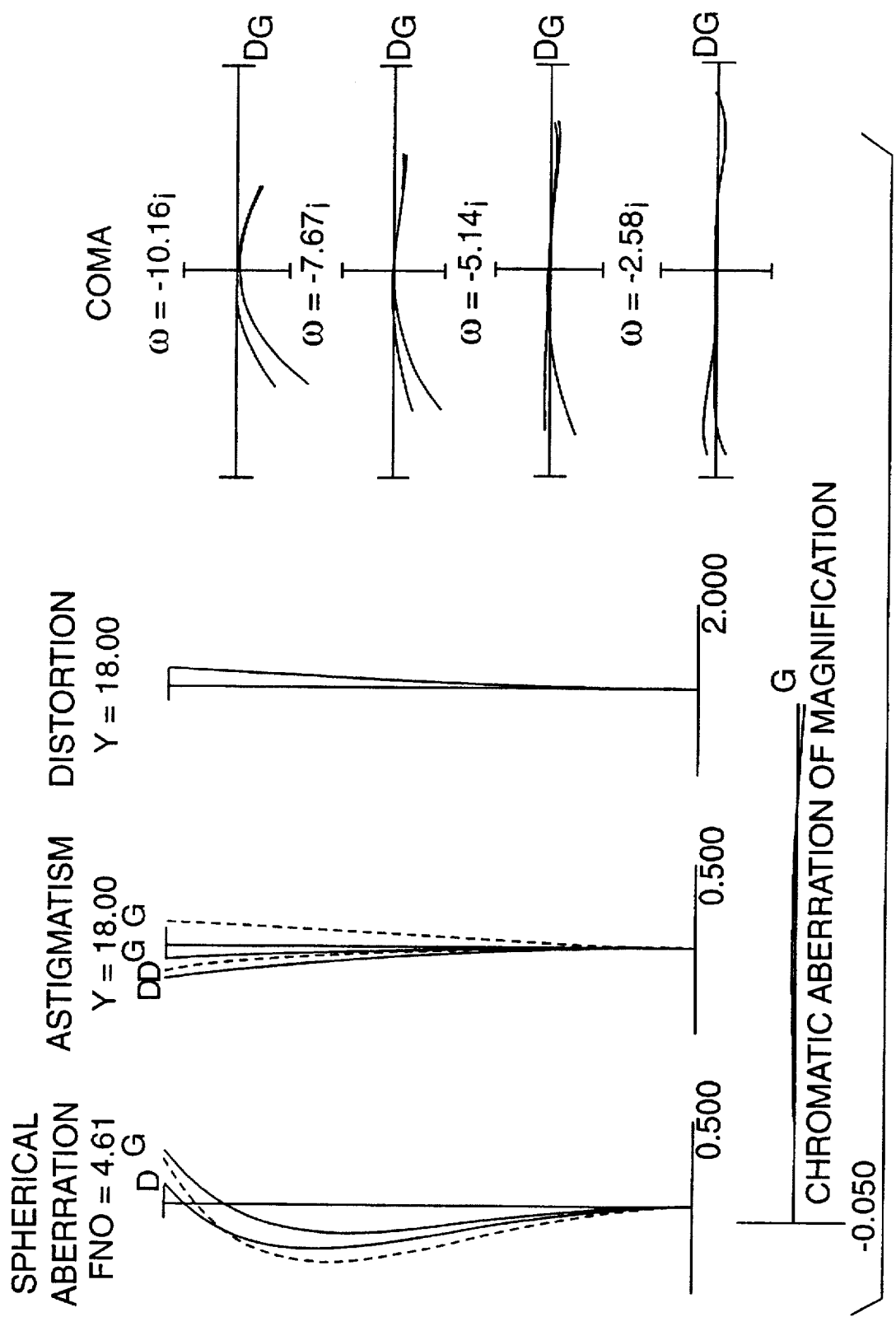
FIG. 10 is a set of aberration plots for Example Embodiment 2 as used for normal sharp-focus photography.
Figure 11:
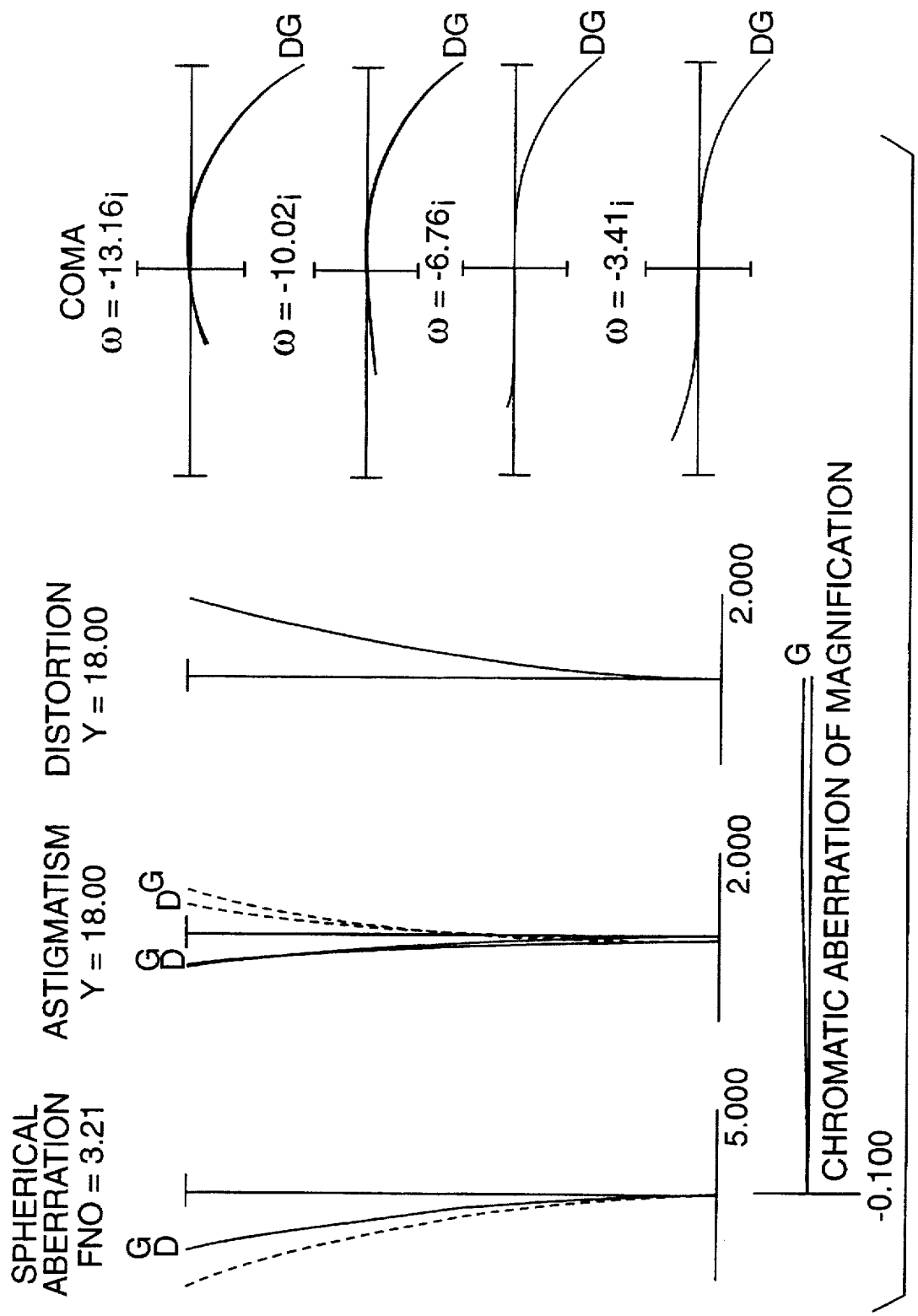
FIG. 11 is a set of aberration plots for Example Embodiment 2 in a first configuration for soft-focus photography.
Figure 12:
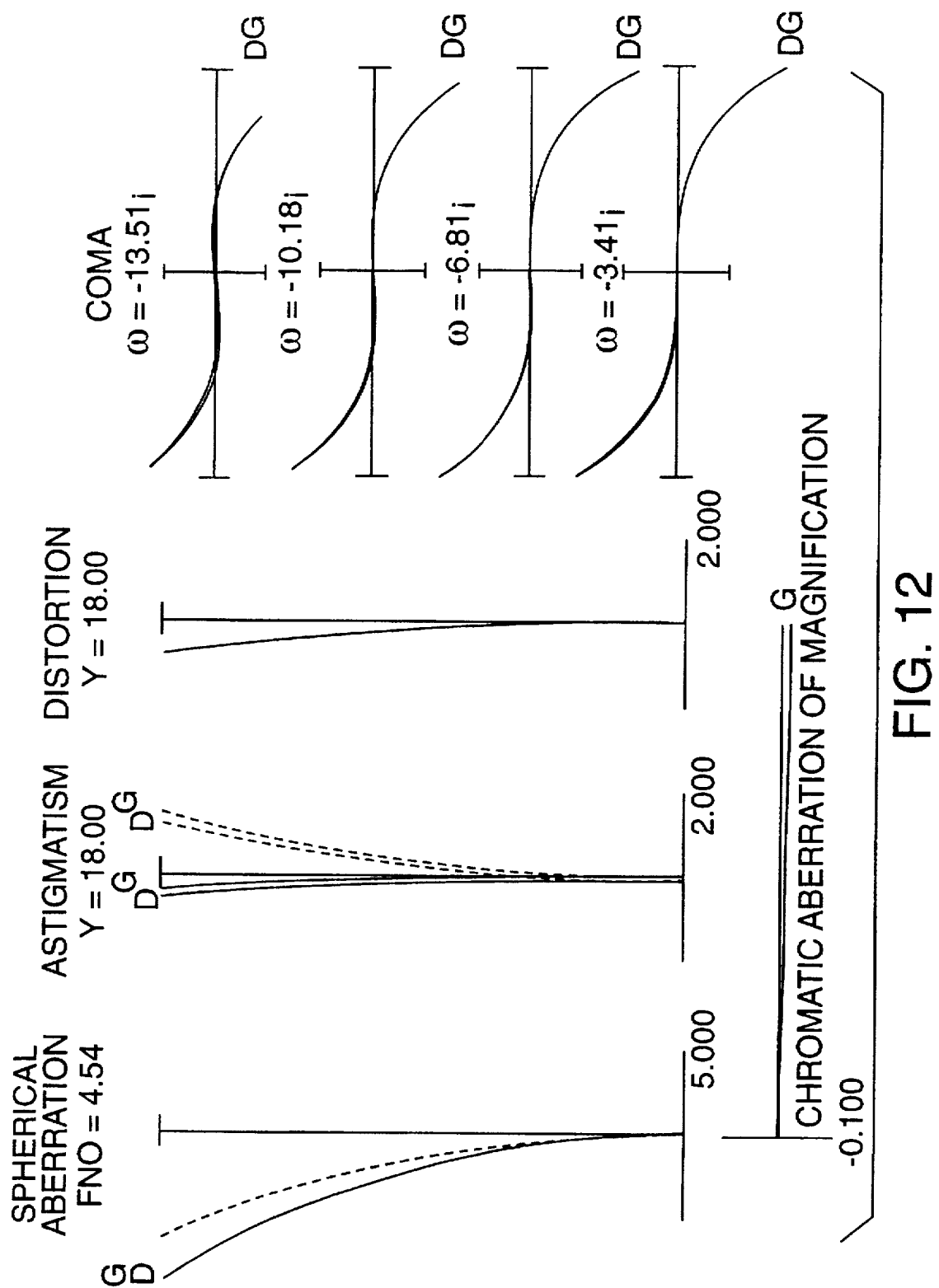
FIG. 12 is a set of aberration plots for Example Embodiment 2 in a second configuration for soft-focus photography.

Values of Conditional Expressions (1) f1/f = 0.755
(2) r4/f = −0.098
(3) $|f(n2 - n1)^{1/2}|/r5 = 0.538$
(4) n2 − n1 = 0.181
(5) $|n1 - (0.4 \cdot n2) - (40/\nu1) + (23/\nu2)| = 0.878$ FIGS. 10–12 are plots of various aberrations for the normal sharp-focus photography configuration, the first soft-focus photography configuration, and the second soft-focus photography configuration, respectively, for this Example Embodiment. In each figure, FNO denotes the F number, Y denotes the image height, ω denotes the half-field angle, D denotes d-line (λ=587.6 nm), and G denotes g-line (λ=435.8 nm). In each astigmatism plot, the solid line denotes the sagittal image plane and the dashed line denotes the meridional image plane. In the spherical aberration plots, the dashed line denotes the sine condition.

As is clear from FIGS. 10–12, the various aberrations are effectively corrected in the normal sharp-focus photography configuration, and excellent soft-focus images can be obtained in the first and second soft-focus photography configurations of this Example Embodiment.

Example Embodiment 3

Figure 13:
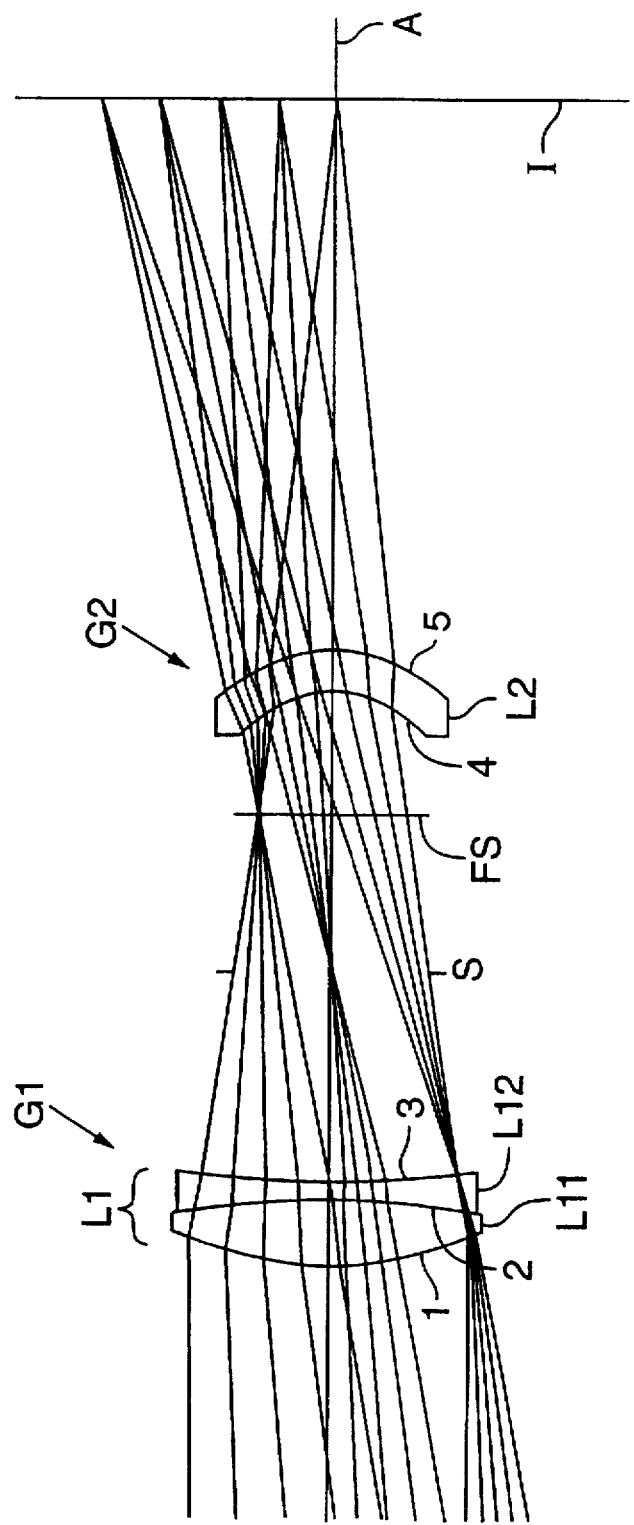
FIG. 13 is an optical diagram showing specific aspects of Example Embodiment 3 as used for normal sharp-focus photography.

FIG. 13 shows specific aspects of Example Embodiment 3 as configured for normal sharp-focus photography. The FIG. 13 embodiment comprises, as the first lens group, a cemented positive lens L1 including a biconvex lens L11 and a biconcave lens L12. The FIG. 13 embodiment also comprises an aperture stop S, a fixed stop FS, and (as the second lens group) a negative meniscus lens element L2 having a convex face oriented toward the image side.

Since harmful flare from the center field angle to the perimeter field angle is blocked by the fixed stop FS, this embodiment exhibits improved perimeter image performance.

FIG. 14 depicts the embodiment of Example Embodiment 3 in a first soft-focus photography configuration. As can be seen, the fixed stop FS and the negative meniscus lens element L2 are retracted from the optical axis. Thus, a soft-focus image is formed at the image plane I by means, in order from the object side, of the cemented positive lens L1 and the aperture stop S.

FIG. 15 depicts the embodiment of Example Embodiment 3 in a second soft-focus photography configuration. As can be seen, the fixed stop FS and the negative meniscus lens element L2 are retracted from the optical axis, and the axial order from the object side of the cemented lens L1 and the aperture stop S has been inverted. Thus, a soft-focus image is formed at the image plane I by means, in order from the object side, of the aperture stop S and the cemented positive lens L1.

Numerical data for Example Embodiment 3 are listed in Table 3. In Table 3, f represents the overall focal length of the lens system, FN represents the F number, 2ω represents the field angle, Bf represents the back focus, and TL represents the telephoto ratio. The numbers in the left-most column of Table 3 represent lens surfaces. With respect to column headings, r is the curvature radius of each lens surface, d is the axial distance between the various lens surfaces, and n and ν are the refractive indices (d-line, λ=587.6 nm) and Abbe numbers of the corresponding lens elements.

TABLE 3

Normal Sharp-Focus Photography Configuration f = 100.000 mm
Bf = 44.216 mm
FN = 4.63
2ω = 20.2°
TL = 0.928

| Surface | r (mm) | d (mm) | n | ν |
|---|---|---|---|---|
| 1 | 28.7942 | 5.3333 | 1.74443 | 49.52 |
| 2 | −53.8486 | 1.1667 | 1.80384 | 33.89 |
| 3 | 59.2046 | 16.6667 | | |
| S | ∞ | 12.5000 | | |
| FS | ∞ | 9.7500 | | |
| 4 | −10.0787 | 3.1667 | 1.62280 | 57.03 |
| 5 | −11.8790 | 44.2160 | | |

First Soft-Focus Photography Configuration f = 79.673 mm
Bf = 72.095 mm
FN = 3.69
2ω = 25.0°

| Surface | r (mm) | d (mm) | n | ν |
|---|---|---|---|---|
| 1 | 28.7942 | 5.3333 | 1.74443 | 49.52 |
| 2 | −53.8486 | 1.1667 | 1.80384 | 33.89 |
| 3 | 59.2046 | 16.6667 | | |
| S | ∞ | 55.4288 | | |

Second Soft-Focus Photography Configuration f = 79.673 mm
Bf = 83.951 mm
FN = 5.21
2ω = 25.7°

| Surface | r (mm) | d (mm) | n | ν |
|---|---|---|---|---|
| S | ∞ | 16.6667 | | |
| 3 | −59.2046 | 1.1667 | 1.80384 | 33.89 |
| 2 | 53.8486 | 5.3333 | 1.74443 | 49.52 |
| 1 | −28.7942 | 83.9509 | | |

Values of Conditional Expressions (1) f1/f = 0.797
(2) r4/f = −0.101
(3) [f(n2 − n1)$^{1/2}$]/r5 = 0.412
(4) n2 − n1 = 0.059
(5) |n1 − (0.4 · n2) − (40/ν1) + (23/ν2)| = 0.894

Figure 16:
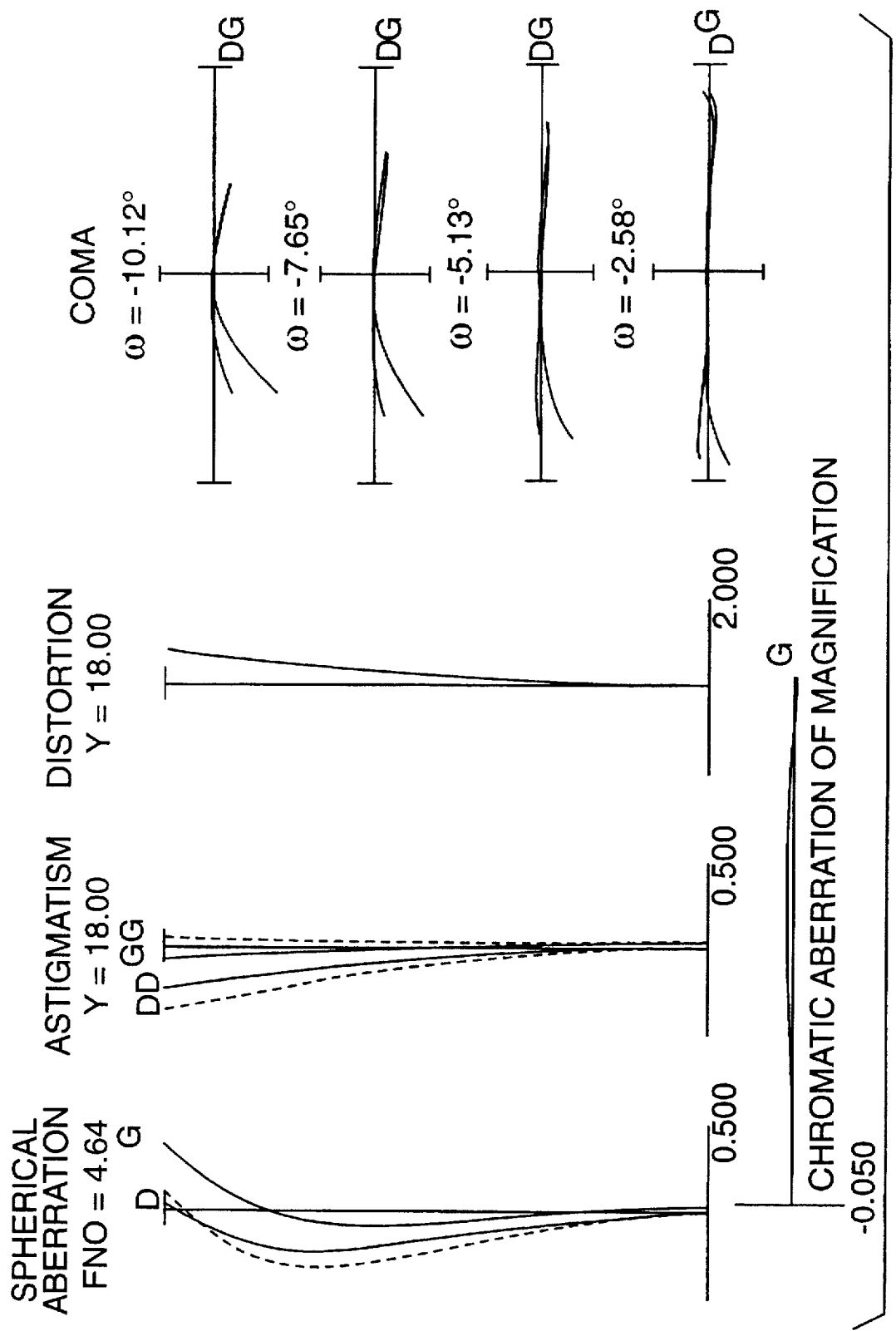
FIG. 16 is a set of aberration plots for Example Embodiment 3 as used for normal sharp-focus photography.
Figure 17:
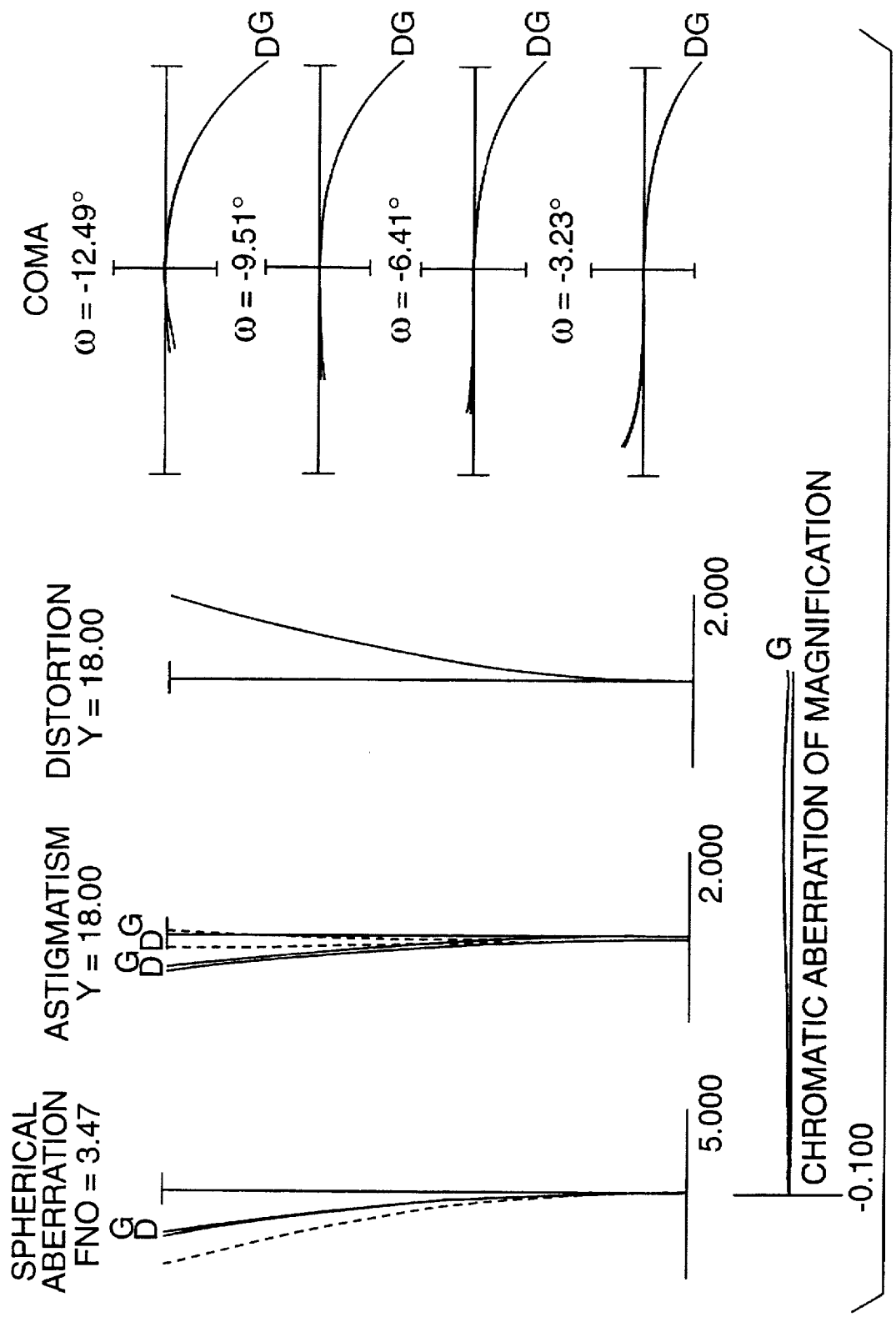
FIG. 17 is a set of aberration plots for Example Embodiment 3 in a first configuration for soft-focus photography.
Figure 18:
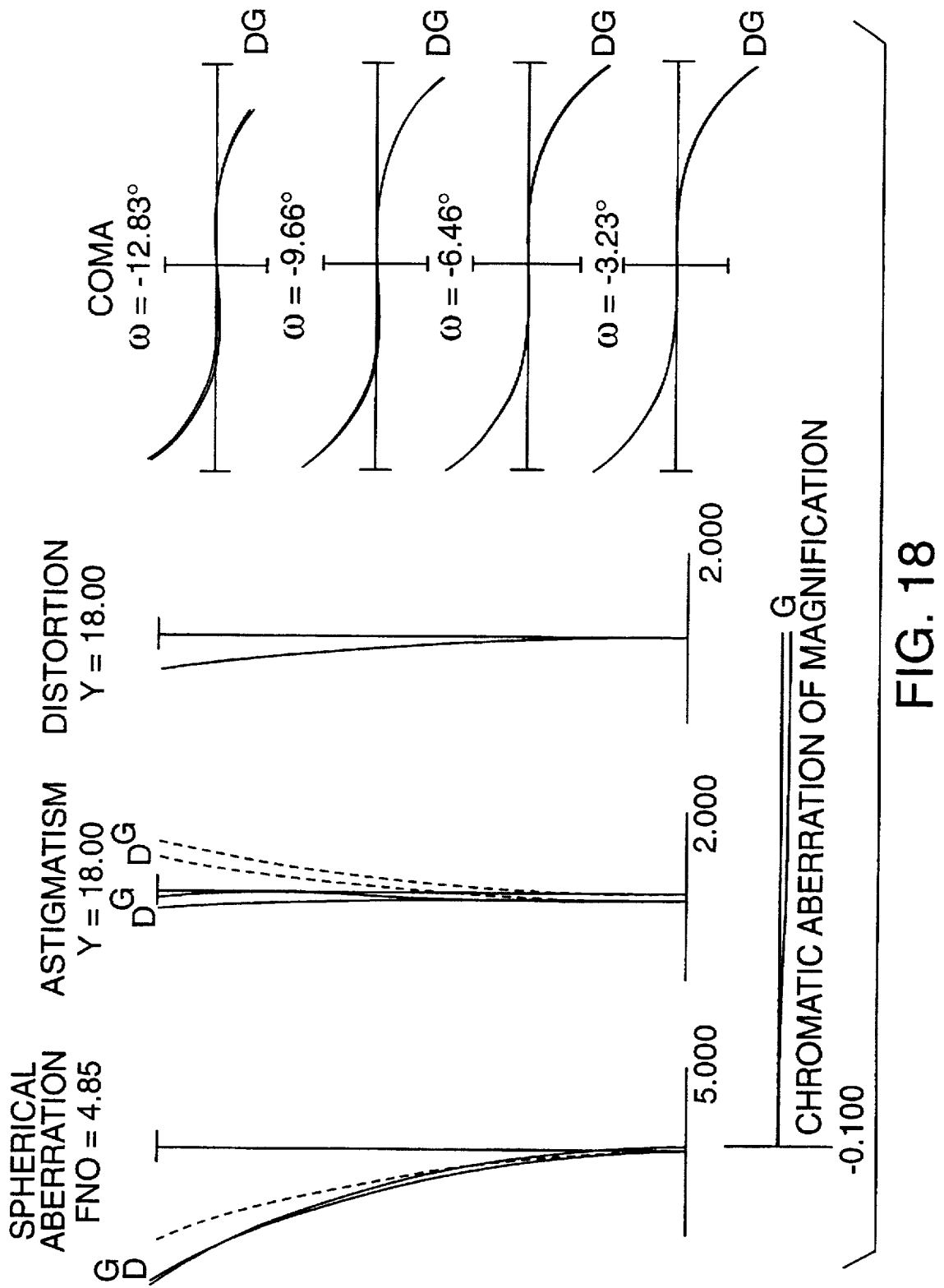
FIG. 18 is a set of aberration plots for Example Embodiment 3 in a second configuration for soft-focus photography.

FIGS. 16–18 are plots of various aberrations for the normal sharp-focus photography configuration, the first soft-focus photography configuration, and the second soft-focus photography configuration, respectively, for this Example Embodiment. In each figure, FNO denotes the F number, Y denotes the image height, ω denotes the half-field angle, D denotes d-line (λ=587.6 nm), and G denotes g-line (λ=435.8 nm). In each astigmatism plot, the solid line denotes the sagittal image plane and the dashed line denotes the meridional image plane. In the spherical aberration plots, the dashed line denotes the sine condition.

As is clear from FIGS. 16–18, the various aberrations are effectively corrected in the normal sharp-focus photography configuration, and excellent soft-focus images can be obtained in the first and second soft-focus photography configurations of this Example Embodiment.

Example Embodiment 4

Figure 19:
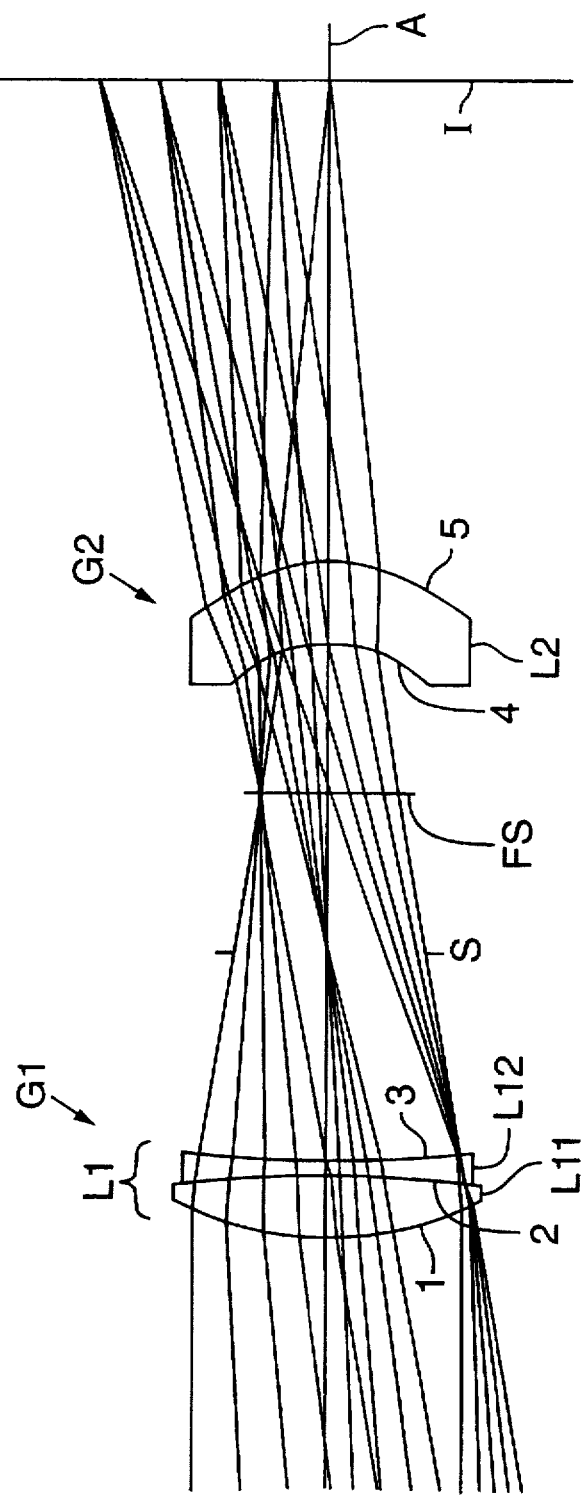
FIG. 19 is an optical diagram showing specific aspects of Example Embodiment 4 as used for normal sharp-focus photography.

FIG. 19 shows specific aspects of Example Embodiment 4 as configured for normal sharp-focus photography. The FIG. 19 embodiment comprises, as the first lens group, a cemented positive lens L1 including a biconvex lens L11 and a biconcave lens L12. The FIG. 19 embodiment also comprises an aperture stop S, a fixed stop FS, and (as the second lens group) a negative meniscus lens element L2 having a convex face oriented toward the image side.

Since harmful flare from the center field angle to the perimeter field angle is blocked by the fixed stop FS, this embodiment exhibits improved perimeter image performance.

Figure 20:
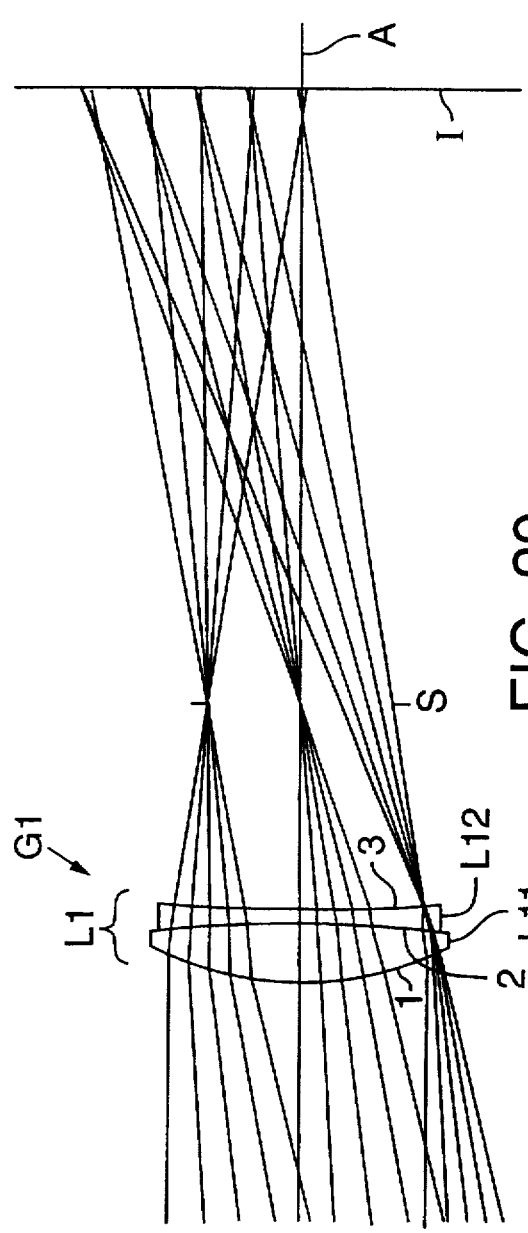
FIG. 20 is an optical diagram showing specific aspects of Example Embodiment 4 in a first soft-focus photography configuration.

FIG. 20 depicts the embodiment of Example Embodiment 4 in a first soft-focus photography configuration. As can be seen, the fixed stop FS and the negative meniscus lens element L2 are retracted from the optical axis. Thus, a soft-focus image is formed at the image plane I by means, in order from the object side, of the cemented positive lens L1 and the aperture stop S.

Figure 21:
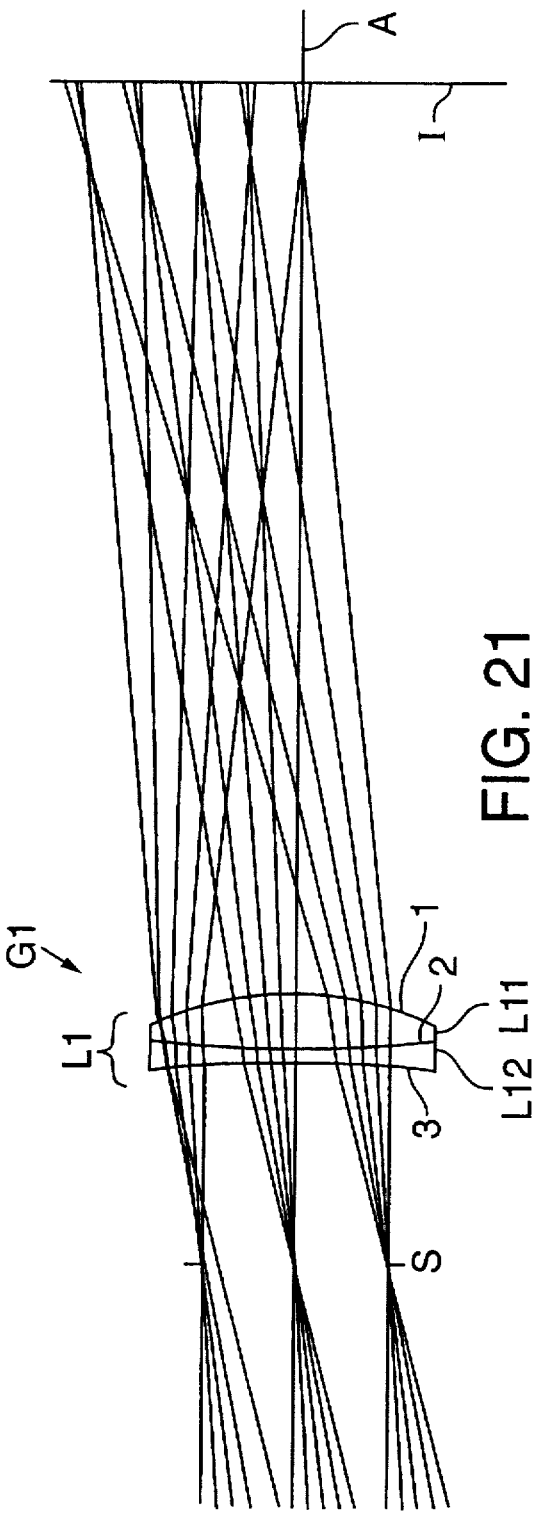
FIG. 21 is an optical diagram showing specific aspects of Example Embodiment 4 in a second soft-focus photography configuration.

FIG. 21 depicts the embodiment of Example Embodiment 4 in a second soft-focus photography configuration. As can be seen, the fixed stop FS and the negative meniscus lens element L2 are retracted from the optical axis, and the axial order from the object side of the cemented lens L1 and the aperture stop S has been inverted. Thus, a soft-focus image is formed at the image plane I by means, in order from the object side, of the aperture stop S and the cemented positive lens L1.

Numerical data for Example Embodiment 4 are listed in Table 4. In Table 4, f represents the overall focal length of the lens system, FN represents the F number, 2ω represents the field angle, Bf represents the back focus, and TL represents the telephoto ratio. The numbers in the left-most column of Table 4 represent lens surfaces. With respect to column headings, r is the curvature radius of each lens surface, d is the axial distance between the various lens surfaces, and n and ν are the refractive indices (d-line, λ=587.6 nm) and Abbe numbers of the corresponding lens elements.

TABLE 4

Normal Sharp-Focus Photography Configuration f = 100.000 mm
Bf = 38.121 mm
FN = 4.72
2ω = 20.3°
TL = 0.915

| Surface | r (mm) | d (mm) | n | ν |
|---|---|---|---|---|
| 1 | 27.7178 | 4.6667 | 1.59319 | 67.87 |
| 2 | −91.8439 | 1.1667 | 1.90265 | 35.72 |
| 3 | 187.5850 | 16.6667 | | |
| S | ∞ | 12.5000 | | |
| FS | ∞ | 11.6667 | | |
| 4 | −11.3670 | 6.6667 | 1.56384 | 60.69 |
| 5 | −15.1061 | 38.1213 | | |

First Soft-Focus Photography Configuration f = 72.536 mm
Bf = 67.177 mm
FN = 3.43
2ω = 27.2°

| Surface | r (mm) | d (mm) | n | ν |
|---|---|---|---|---|

TABLE 4-continued

| 1 | 27.7178  | 4.6667  | 1.59319 | 67.87 |
|---|----------|---------|---------|-------|
| 2 | -91.8439 | 1.1667  | 1.90265 | 35.72 |
| 3 | 187.5850 | 16.6667 |         |       |
| S | ∞        | 50.5106 |         |       |

Second Soft-Focus Photography Configuration f = 72.536 mm
Bf = 74.490 mm
FN = 4.82
2ω = 28.2°

| Surface | r (mm)    | d (mm)  | n       | ν     |
|---------|-----------|---------|---------|-------|
| 3       | ∞         | 16.6667 |         |       |
| 2       | -187.5850 | 1.1667  | 1.90265 | 35.72 |
| 1       | 91.8439   | 4.6667  | 1.59319 | 67.87 |
| S       | -27.7178  | 74.4900 |         |       |

Figure 22:
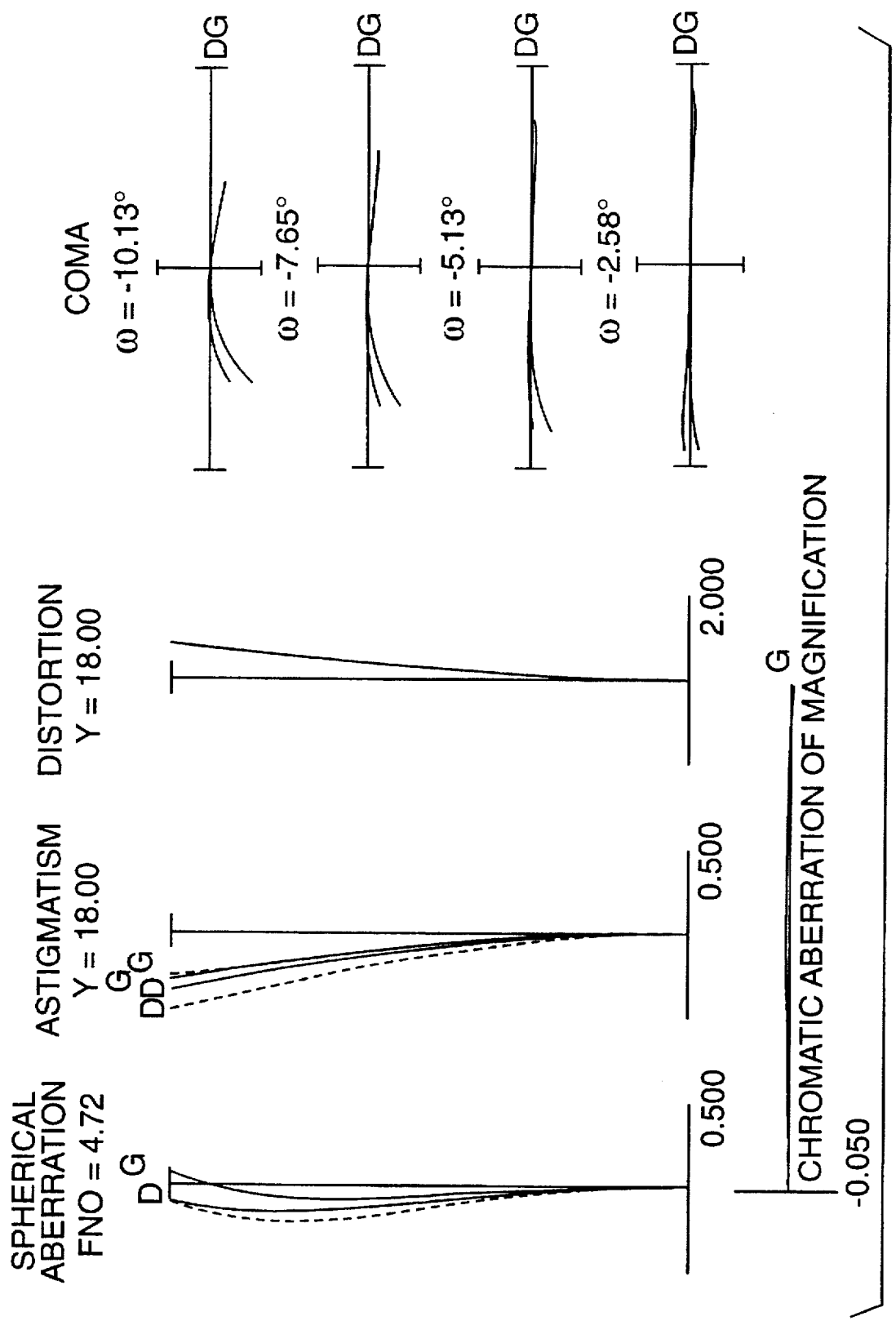
FIG. 22 is a set of aberration plots for Example Embodiment 4 as used for normal sharp-focus photography.
Figure 23:
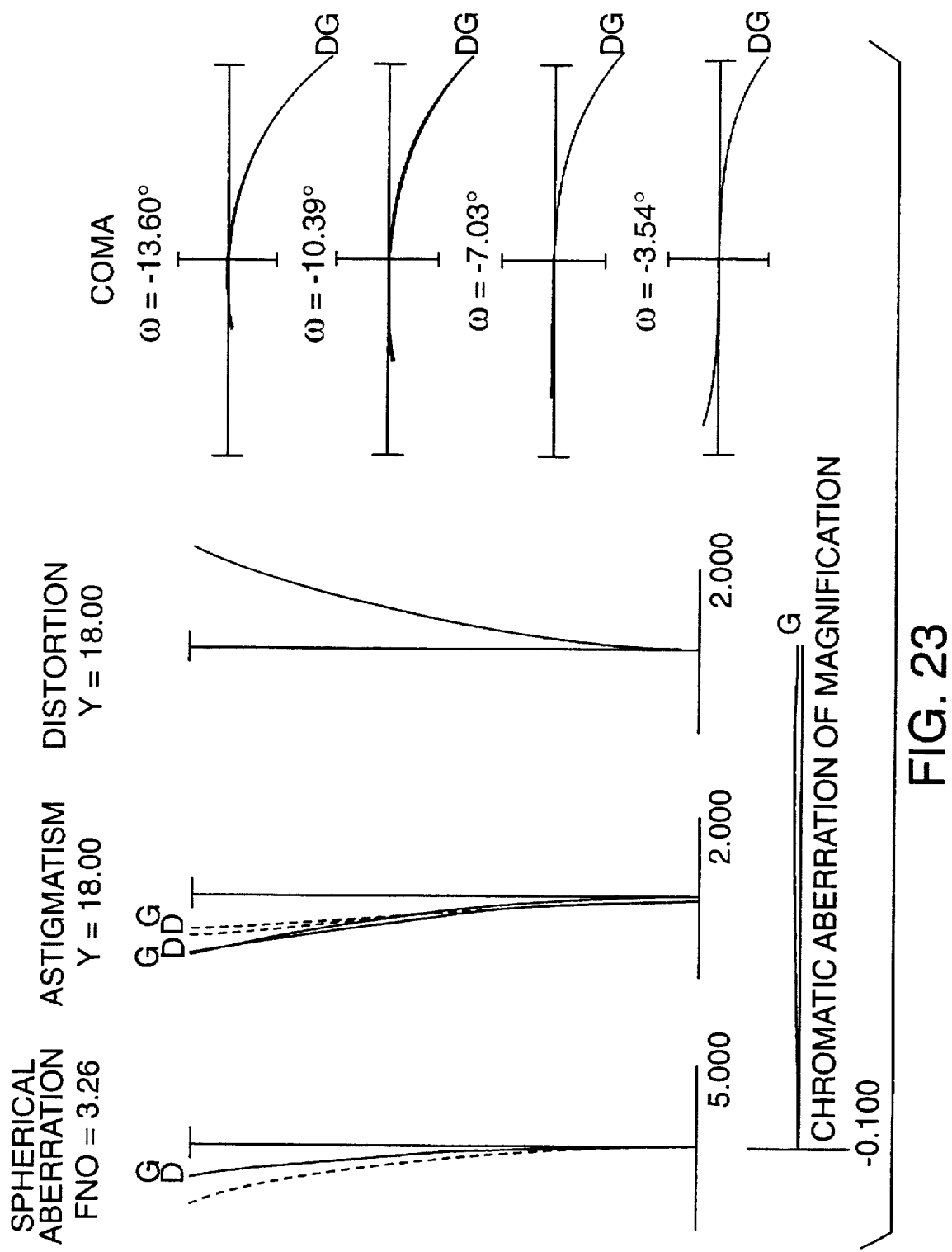
FIG. 23 is a set of aberration plots for Example Embodiment 4 in a first configuration for soft-focus photography.
Figure 24:
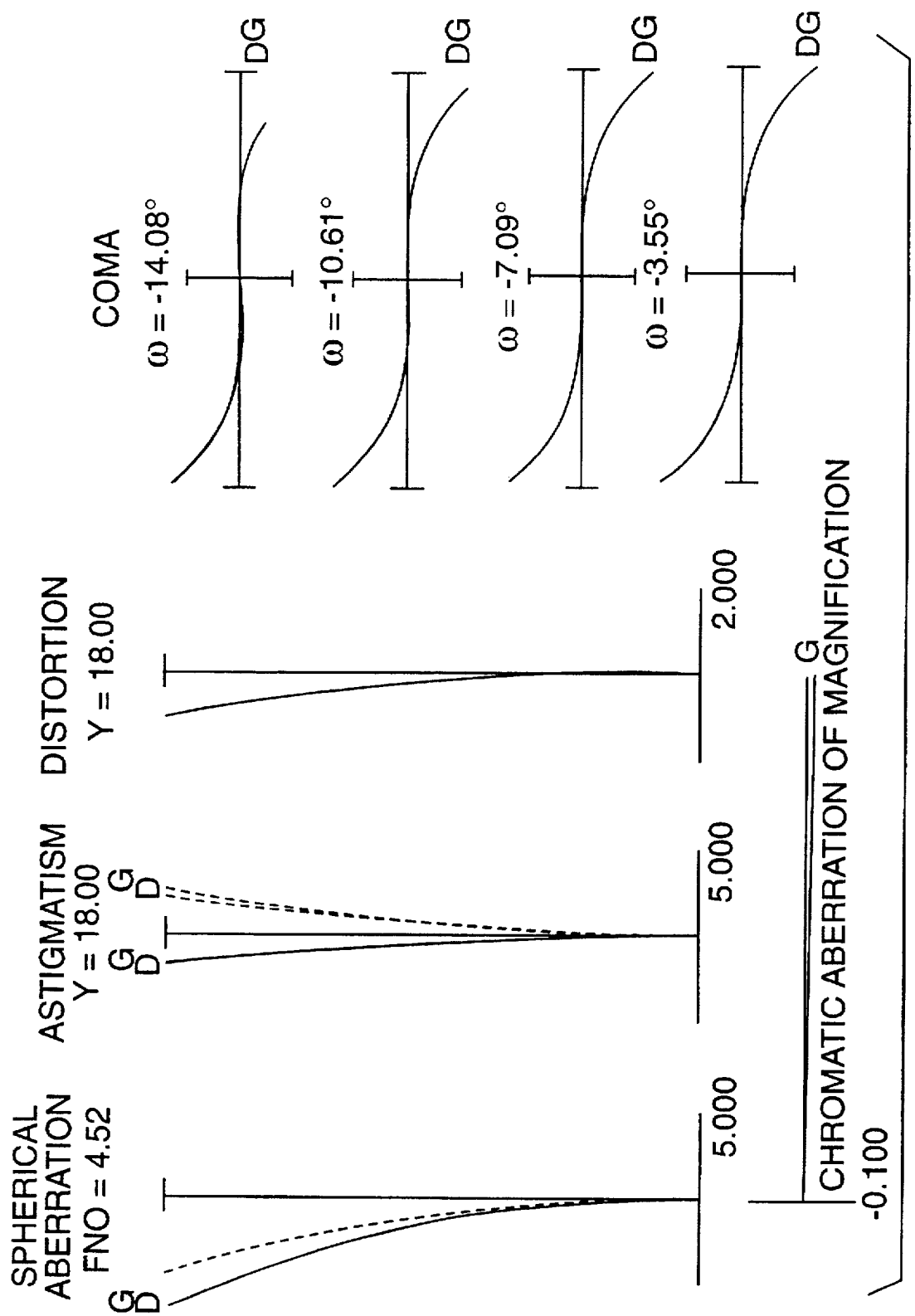
FIG. 24 is a set of aberration plots for Example Embodiment 4 in a second configuration for soft-focus photography.

Values of Conditional Expressions (1) f1/f = 0.725
(2) r4/f = -0.114
(3) $|f(n2 - n1)^{1/2}|/r5 = 0.297$
(4) n2 - n1 = 0.309
(5) $|n1 - (0.4 \cdot n2) - (40/\nu1) + (23/\nu2)| = 0.887$ FIGS. 22–24 are plots of various aberrations for the normal sharp-focus photography configuration, the first soft-focus photography configuration, and the second soft-focus photography configuration, respectively, for this Example Embodiment. In each figure, FNO denotes the F number, Y denotes the image height, ω denotes the half-field angle, D denotes d-line (λ=587.6 nm), and G denotes g-line (λ=435.8 nm). In each astigmatism plot, the solid line denotes the sagittal image plane and the dashed line denotes the meridional image plane. In the spherical aberration plots, the dashed line denotes the sine condition.

As is clear from FIGS. 22–24, the various aberrations are effectively corrected in the normal sharp-focus photography configuration, and excellent soft-focus images can be obtained in the first and second soft-focus photography configurations of this Example Embodiment.

Therefore, it will be readily appreciated that the present invention provides a lens system, suitable for photographic use, that can be switched from a normal sharp-focus photography configuration to a soft-focus photography configuration at any time, and that can effectively correct all types of optical aberrations when used for normal sharp-focus photography. Furthermore, the lens system can be made conveniently small and simple (e.g., a 2-group×3-element construction).

It shall be apparent from the foregoing that the embodiments described herein are representatively illustrative of the subject invention and are not to be regarded as limiting in any way. The present invention as set forth in the appended claims, therefore, encompass all changes, modifications, and alternative configurations that fall within the full meaning and range of equivalency of the claims.

What is claimed is:

1. A lens system, comprising:

(a) a first lens group having positive refractive power, an aperture stop, and a second lens group having negative refractive power;

(b) the lens system being operable in a first configuration with sufficient aberration correction to form a sharp-focus image of an object on an image plane of the lens system, in which first configuration the first lens group is situated axially objectwise, the second lens group is situated axially imagewise, and the aperture stop is axially situated between the first and second lens groups; and (c) the lens system being operable in a second configuration that exhibits sufficient spherical aberration to form a soft-focus image on the image plane of the object, in which second configuration the second lens group is axially retracted, thereby leaving the first lens group and the aperture axially situated to form the image.

2. The lens system of claim 1, wherein the second configuration comprises either or both of a first soft-focus configuration in which the first lens group is axially situated objectwise of the aperture stop, and a second soft-focus configuration in which the aperture stop is axially situated objectwise of the first lens group.

3. The lens system of claim 1 operable to produce, at the image plane, a mid-range telephoto image of the object.

4. The lens system of claim 1, wherein the first lens group is a cemented positive meniscus lens having, in the first configuration, a convex surface oriented objectwise.

5. The lens system of claim 4, wherein the cemented positive meniscus lens of the first lens group comprises a biconvex lens element cemented to a negative lens element, the biconvex lens element being situated objectwise of the negative lens element in the first configuration.

6. The lens system of claim 5, wherein the negative lens element in the cemented positive lens element of the first lens group is biconcave.

7. The lens system of claim 5, wherein the second lens group consists of either a single negative meniscus lens element or a cemented negative meniscus lens, the second lens group having, in the first configuration, a convex surface oriented imagewise and a concave surface oriented objectwise.

8. The lens system of claim 7, satisfying the condition:

$$0 \leq |f(n2-n1)^{1/2}|/r5 < 0.55$$

wherein f is the focal length of the lens system in the first configuration, r5 is the curvature radius of the imagewise convex surface of the second lens group, n1 is the refractive index (d-line) of the biconvex lens element in the first lens group, and n2 is the refractive index (d-line) of the negative lens element in the first lens group.

9. The lens system of claim 8, satisfying the further condition:

$$-0.15 < r4/f < -0.09$$

wherein r4 is the curvature radius of the objectwise concave surface of the second lens group.

10. The lens system of claim 7, satisfying the condition:

$$-0.15 < r4/f < -0.09$$

wherein f is the focal length of the lens system in the first configuration, and r4 is the curvature radius of the objectwise concave surface of the second lens group.

11. The lens system of claim 7, satisfying the conditions:

$$0 \leq |f(n2-n1)^{1/2}|/r5 < 0.55$$

$$0.05 < n2 - n1$$

$0.85<|n1-(0.4 \cdot n2)-(40/v1)+(23/v2)|<0.95$ wherein f is the focal length of the lens system in the first configuration, r5 is the curvature radius of the convex surface of the second lens group, n1 and v1 are the refractive index (d-line) and Abbe number, respectively, of the biconvex lens element in the first lens group, and n2 and v2 are the refractive index (d-line) and Abbe number, respectively, of the negative lens element in the first lens group.

12. The lens system of claim 7, satisfying the conditions:

$0.7<f1/f<0.85$ $-0.15<r4/f<-0.09$ wherein f is the focal length of the lens system in the first configuration, f1 is the focal length of the first lens group, and r4 is the curvature radius of the objectwise surface of the second lens group.

13. The lens system of claim 7, satisfying the conditions:

$0.7<f1/f<0.85$ $-0.15<r4/f<-0.09$ $0 \leq |f(n2-n1)^{1/2}|/r5<0.55$ $0.05<n2-n1$ $0.85<|n1-(0.4 \cdot n2)-(40/v1)+(23/v2)|<0.95$ wherein f is the focal length of the lens system in the first configuration, f1 is the focal length of the first lens group, r5 is the curvature radius of the convex surface of the second lens group, r4 is the curvature radius of the objectwise surface of the second lens group, n1 and v1 are the refractive index (d-line) and Abbe number, respectively, of the biconvex lens element in the first lens group, and n2 and v2 are the refractive index (d-line) and Abbe number, respectively, of the negative lens element in the first lens group.

14. The lens system of claim 1 mounted in a lens barrel.

15. A lens system for forming an image of an object, the lens system comprising:

(a) a first lens group having positive refractive power, an aperture stop, and a detachable second lens group having negative refractive power; and (b) the lens system being switchable from a normal sharp-focus configuration to a soft-focus configuration, in which normal sharp-focus configuration the first lens group is situated objectwise on an optical axis, the second lens group is situated imagewise on the optical axis, and the aperture stop is situated on the optical axis between the first and second lens groups and spaced a distance from the first lens group, the first lens group imparting a spherical aberration that is sufficiently corrected by the second lens group to form a sharp-focus image of the object on an image plane of the lens system; and in which soft-focus photography configuration the second lens group is detached from the first lens group and the aperture stop so as to allow the first lens group, spaced the distance from the aperture stop, to form an image of the object on the image plane, the image having sufficient spherical aberration to have a soft-focus characteristic.

16. The lens system of claim 15, wherein the first lens group is a cemented positive meniscus lens having, in the normal sharp-focus configuration, an objectwise biconvex lens element cemented to an imagewise negative lens element.

17. The lens system of claim 16, wherein the second lens group consists of either a single negative meniscus lens element or a cemented negative meniscus lens, the second lens group having, in the normal sharp-focus configuration, a convex surface oriented imagewise and a concave surface oriented objectwise.

18. The lens system of claim 17, satisfying the condition:

$0 \leq |f(n2-n1)^{1/2}|/r5<0.55$ wherein f is the focal length of the lens system in the normal sharp-focus configuration, r5 is the curvature radius of the imagewise convex surface of the second lens group, n1 is the refractive index (d-line) of the biconvex lens element in the first lens group, and n2 is the refractive index (d-line) of the negative lens element in the first lens group.

19. The lens system of claim 18, satisfying the further condition:

$-0.15<r4/f<-0.09$ wherein r4 is the curvature radius of the objectwise concave surface of the second lens group.

20. The lens system of claim 17, satisfying the condition:

$-0.15<r4/f<-0.09$ wherein f is the focal length of the lens system in the normal sharp-focus configuration, and r4 is the curvature radius of the objectwise concave surface of the second lens group.

21. The lens system of claim 17, satisfying the conditions:

$0 \leq |f(n2-n1)^{1/2}|/r5<0.55$ $0.05<n2-n1$ $0.85<|n1-(0.4 \cdot n2)-(40/v1)+(23/v2)|<0.95$ wherein f is the focal length of the lens system in the normal sharp-focus configuration, r5 is the curvature radius of the convex surface of the second lens group, n1 and v1 are the refractive index (d-line) and Abbe number, respectively, of the biconvex lens element in the first lens group, and n2 and v2 are the refractive index (d-line) and Abbe number, respectively, of the negative lens element in the first lens group.

22. The lens system of claim 17, satisfying the conditions:

$0.7<f1/f<0.85$ $-0.15<r4/f<-0.09$ wherein f is the focal length of the lens system in the normal sharp-focus configuration, f1 is the focal length of the first lens group, and r4 is the curvature radius of the objectwise surface of the second lens group.

23. The lens system of claim 17, satisfying the conditions:

$0.7<f1/f<0.85$ $-0.15<r4/f<-0.09$ $0 \leq |f(n2-n1)^{1/2}|/r5<0.55$ $0.05<n2-n1$ $0.85<|n1-(0.4 \cdot n2)-(40/v1)+(23/v2)|<0.95$ wherein f is the focal length of the lens system in the normal sharp-focus configuration, f1 is the focal length of the first lens group, r5 is the curvature radius of the convex surface of the second lens group, r4 is the curvature radius of the objectwise surface of the second lens group, n1 and v1 are the refractive index (d-line) and Abbe number, respectively, of the biconvex lens element in the first lens group, and n2 and v2 are the refractive index (d-line) and Abbe number, respectively, of the negative lens element in the first lens group.

24. The lens system of claim 15, mounted in a lens barrel.

* * * * *

UNITED STATES PATENT AND TRADEMARK OFFICE
CERTIFICATE OF CORRECTION

PATENT NO. : 5,796,530

DATED : August 18, 1998

INVENTOR(S) :
KOICHI OSHITA

It is certified that error appears in the above-indentified patent and that said Letters Patent is hereby corrected as shown below:

Column 7, line 57, "mount 3" should be --mount 13--.

In the Claims:

Column 16, line 44, claim 8, "ni" should be --n1--.

Column 16, line 67, claim 11, "0.05 < n2 - < n1" should be --0.05 < n2 - n1--.

Signed and Sealed this

Twelfth Day of October, 1999

Attest:

Q. TODD DICKINSON

Attesting Officer     Acting Commissioner of Patents and Trademarks